United States Patent [19]
Yoshikawa et al.

[11] Patent Number: 6,102,338
[45] Date of Patent: *Aug. 15, 2000

[54] ATTITUDE DETERMINATION SYSTEM FOR ARTIFICIAL SATELLITE

[75] Inventors: Shoji Yoshikawa; Katsuhiko Yamada; Hiroshi Sakashita; Hiroo Yonechi, all of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/919,193

[22] Filed: Aug. 28, 1997

[30] Foreign Application Priority Data

Aug. 30, 1996 [JP] Japan ...................................... 8-230423

[51] Int. Cl.$^7$ ...................................................... B64G 1/36
[52] U.S. Cl. .......................................... 244/171; 701/222
[58] Field of Search .................................... 244/171, 164; 702/207, 208, 226; 250/203.6; 701/222

[56] References Cited

U.S. PATENT DOCUMENTS

| | | |
|---|---|---|
| 3,100,264 | 8/1963 | Jaffe et al. . |
| 3,127,516 | 3/1964 | Ammerman et al. . |
| 4,621,329 | 11/1986 | Jacob . |
| 4,740,681 | 4/1988 | Tsuno . |
| 4,944,587 | 7/1990 | Harigae . |
| 5,177,686 | 1/1993 | Boinghoff et al. . |
| 5,223,702 | 6/1993 | Conley . |
| 5,348,255 | 9/1994 | Abreu . |

FOREIGN PATENT DOCUMENTS 85304275  9/1984  European Pat. Off. .

OTHER PUBLICATIONS

"Star–Tracker Based, All–Sky, Autonomous Attitude Determination", L. DeAntonio et al, SPIE vol. 1949 Space Guidance, Control, and Tracking(19930 pp. 204–215.
"Optima Periodic control for Spacecraft Pointing and Attitude Determination", Mark E. Pittelkau, J. Guidance, Control, and Dynamics, vol. 16, No. 6 (1993) pp. 1078–1084.
"Spacecraft Attitude Determination and Control" Wertz, D. Reidel Pub. Co. pp. 424–428.

*Primary Examiner*—Peter M. Poon
*Assistant Examiner*—Tien Dinh
*Attorney, Agent, or Firm*—Sughrue, Mion, Zinn, Macpeak & Seas, PLLC

[57] ABSTRACT

An attitude determination system for an artificial satellite capable of performing star identification without need for the aid of ground station includes an image processing module (17) for processing star images observed at predetermined time points by a star sensor (16) mounted on the artificial satellite (1) for arithmetically determining direction vectors of the observed stars, a rotation estimating module (18) for estimating a rotational motion of the artificial satellite (1) between an attitude of the artificial satellite at a predetermined time point and an attitude of the artificial satellite at another time point, an elongation estimating module (19) for estimating elongations between the direction vectors of plural stars the images of which are picked up at a same time point by the star sensor and estimating the elongations between the direction vectors of plural stars the images of which are picked up at different time points by the star sensor on the basis of the estimated rotational motion, a star identifying module (20) for establishing correspondences between a plurality of the stars for which relation of the elongation has been determined and stars on a star catalog for identifying the stars, and an attitude angle estimating module (21) for estimating an attitude angle of the artificial satellite on the basis of result of identification of the stars.

19 Claims, 13 Drawing Sheets

FIG. 15
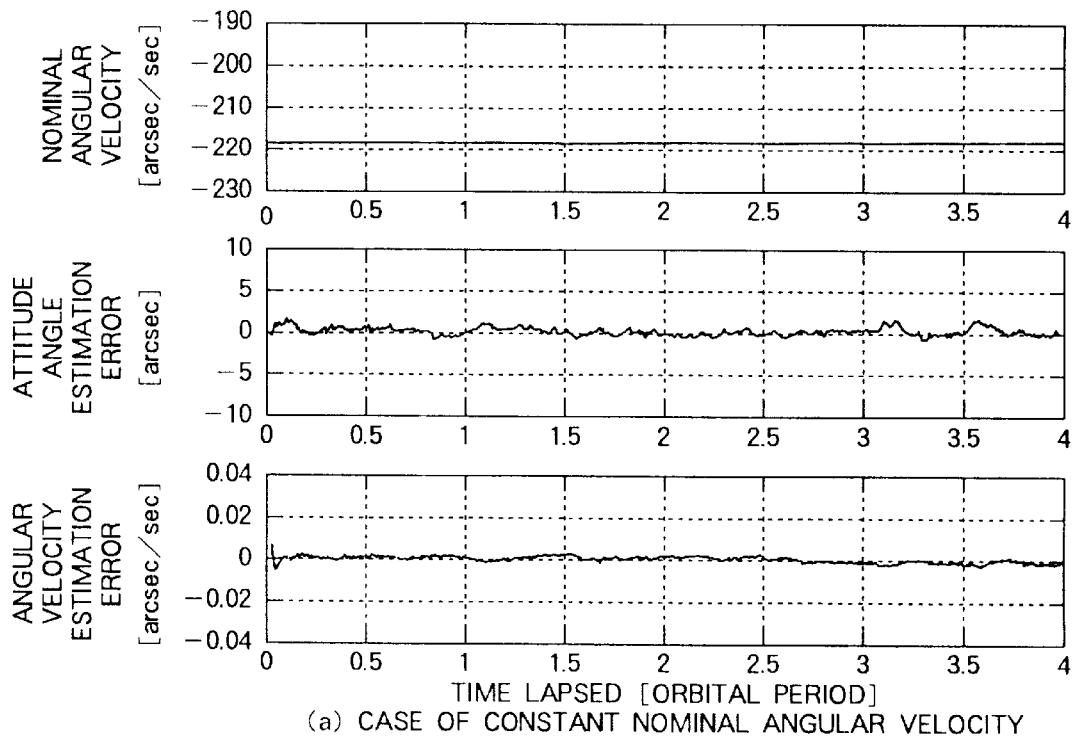
(a) CASE OF CONSTANT NOMINAL ANGULAR VELOCITY
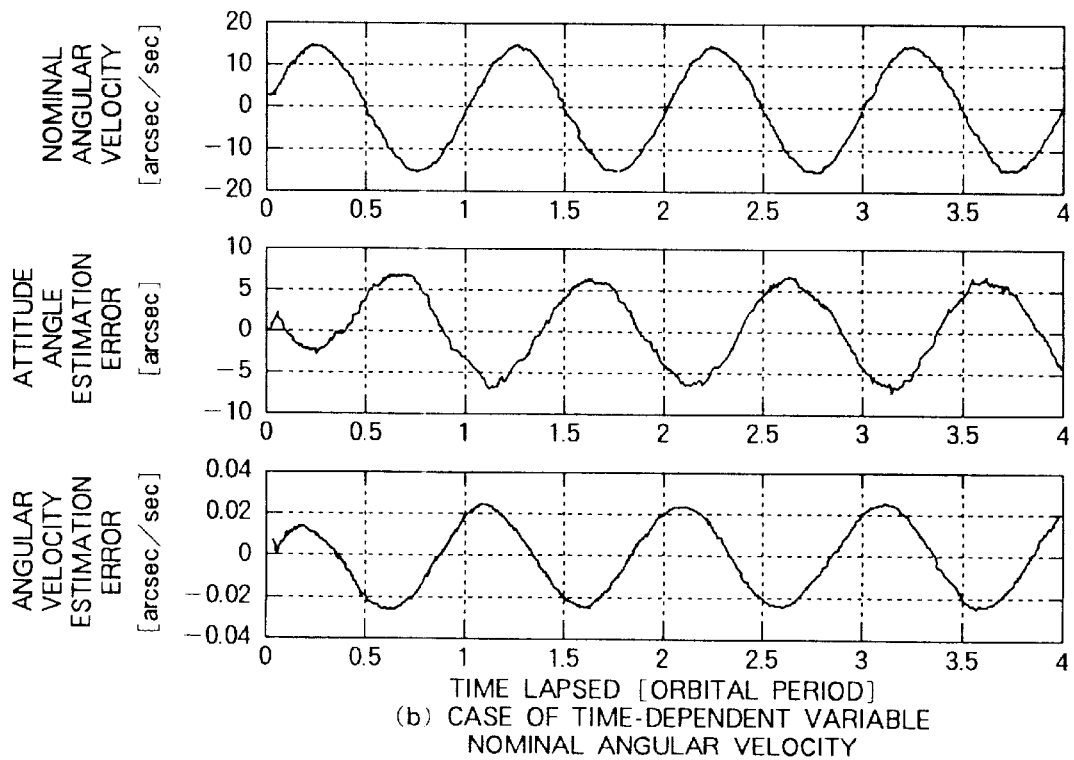
(b) CASE OF TIME-DEPENDENT VARIABLE NOMINAL ANGULAR VELOCITY

ATTITUDE DETERMINATION SYSTEM FOR ARTIFICIAL SATELLITE

BACKGROUND OF THE INVENTION

1. Field of the Invention

The present invention relates to an attitude determination system for an artificial satellite for determining attitude of a spacecraft or an artificial satellite on the basis of identification as to whether the stars on an all-sky star catalog are caught by a star sensor. Incidentally, the term "artificial satellite" is used herein as being equivalent to the term "spacecraft".

2. Description of Related Art

For having better understanding of the concept underlying the present invention, description will first be made in some detail of a conventional artificial satellite attitude determination system. FIG. 13 is a schematic diagram for illustrating a star identifying operation in a conventional artificial satellite attitude determination system which is disclosed, for example, in Japanese Unexamined Patent Application Publication No. 6100/1985 (JP-A-60-6100). Referring to the figure, reference numeral 1 designates an artificial satellite equipped with a star sensor (not shown) and traveling or cruising around the earth 2, numeral 3 designates a plurality of stars on the celestial sphere observed by the star sensor mounted on the artificial satellite 1, numeral 4 designates a star concerned of those observed by the star sensor, numeral 5 designates a circle having a radius corresponding to a maximum value of the angle of field of the star sensor, numeral 6 designates all the stars that are darker than the star 4 concerned within the circle 5, numeral 7 designates a set including collected star patterns in all of the sky, numeral 8 designates a table containing combinations of the star patterns in all of the sky and all characteristic quantities, respectively, numeral 9 denotes a table prepared by rearranging the table 8 in the descending order of the characteristic quantities, and numeral 10 denotes a table generated by extracting only the pattern identifying numbers from the table 9. A star catalog can be created on the basis of the contents of the tables mentioned above.

Next, description will turn to the operation of the conventional artificial satellite attitude determination system. The artificial satellite 1 carrying the star sensor travels around the earth 2 while observing a plurality of stars 3 on the celestial sphere by means of the star sensor. The characteristic quantities required for the star identification are determined in such a manner as mentioned below. For all the stars on the celestial sphere which can be caught by the star sensor, the circle 5 is depicted around the concerned star 4 assumed as being positioned at the center with a radius corresponding to the maximum value of the angle of field of the star sensor, whereon the stars 6 falling within the circle and darker than the central star 4 are sorted out. By drawing lines radially from the concerned star 4 located at the center to the individual darker stars 6, a radial line pattern is generated. The star identifying number of the concerned star 4 is affixed to the generated radial line pattern as the pattern identifying number.

On the basis of the set 7 of the patterns for the stars in all the sky, the table 8 is generated by combining the characteristic quantities and the pattern identifying numerac of all the patterns. In the table 8, the characteristic quantities and the pattern identifying numbers are rearranged in the descending order of the magnitudes of the characteristic quantities, whereby the table 9 is generated in which the characteristic quantities and the pattern identifying numbers are listed in the descending order of the characteristic quantities. On the basis of the table addresses of the table 9, approximating functions 11 for representing the characteristic quantities are generated. Additionally, the pattern identifying number table 10 containing only the pattern identifying numbers extracted from the table 9 is created. For the star identification, the pattern generated through the similar procedure for the star which is brightest in the image data obtained through observation by the star sensor and the functions 11 are matched or collated with each other, to thereby extract a common or shared portion from a corresponding sub-table of the pattern identifying number table 10. When only one shared portion is extracted, this means that the star identification has been carried out successfully.

FIG. 14 is a block diagram showing a typical configuration of a conventional artificial satellite attitude determination system equipped with a star sensor. This artificial satellite attitude determination system is comprised of an attitude propagation unit 12, an attitude updating unit 13 and a time-independent drift estimation module 13a. Heretofore, in the system for determining the attitude of the artificial satellite with the aid of combination of a star sensor 16 and a gyro 14, it has been a general practice to estimate the drift of the gyro 14 with the precise attitude angle determined on the basis of the output of the star sensor 16. More specifically, the output or observation values of the star sensor 16 are arithmetically processed by a star sensor processing unit 15 to determine an attitude angle qm of the artificial satellite, whereon a difference qe between the attitude angle qm and an estimated attitude angle qh obtained as the output of the attitude propagation unit 12 is inputted to the attitude updating unit 13 as an estimation error.

In the attitude updating unit 13, the drift ωd of the gyro 14 is estimated through the medium of a first-order filter KPO+KIO/s on the presumption that the drift is time-invariable, whereon the estimated value ωd is subtracted from the gyro output ωm to obtain an estimated value ωh of the attitude angular velocity (also known as the attitude rate) of the satellite. The attitude propagation unit 12 is so designed as to add the estimated value of the attitude angle of the artificial satellite one sampling cycle before by integrating the estimated value ωh of the attitude angular velocity as a function of time and output additionally an estimated value qh of the attitude angle at the current time point.

FIG. 15 is a view for graphically illustrating steady characteristics of attitude angle estimation errors of a navigation filter employed in the conventional attitude determination system. As can be seen in the figure, in the case where the nominal angular velocity (or nominal attitude rate) of the artificial satellite assumes a constant value, the error involved in estimating the attitude angle of the satellite is substantially equal to zero, indicating the desirable characteristics. However, when the nominal angular velocity changes periodically as in the case of the artificial satellite in which steering operation is performed about a yaw axis, error in the attitude angle estimation makes appearance significantly in dependence on the periodical change of the nominal angular velocity.

In the conventional star identifying method known heretofore, identification of the star is performed by collating the characteristic quantities arithmetically determined on the basis of the star images falling within the visual field of the star sensor at a given time point with the stars on the star catalog. Consequently, the conventional star identifying method is imposed with requirement that the visual field of the star sensor has to be set widely so that a sufficient number of stars required for the identification make appearance within the visual field without fail or the identification has to be given up at a time point when a sufficient number of stars can not be seen within the visual field.

As the characteristic quantities mentioned above, there are selected such quantities which remain invariable independent of rotation about the optical axis of camera such as the elongation, i.e., an angle formed by the direction vectors of two stars, an area of a triangle constituted by three stars on an imaging screen of the camera. Thus, the identification which makes much of a relative relation between the predicted star position and the observed star position has not always been realized when the positions of the stars on the imaging screen of the camera can roughly be predicted from the star catalog as in the case where the attitude value of the artificial satellite can be estimated.

Additionally, when the identification is to be performed by a computer system mounted on the artificial satellite, it is necessarily required that the direction of the sight of the star sensor is known roughly in advance and that the range on the star catalog to be searched is sufficiently limited. Unless such computational capability can be ensured by the satellite-onboard computer, it is necessary to send the observation data to a ground station where the arithmetic operations for the identification are carried out, the result of which is then sent back to the artificial satellite.

On the other hand, when the attitude determination of the artificial satellite is performed on the basis of the result of the identification, it is required to determine parameters representing the coordinate transformation or rotational motion between the star catalog data concerning the direction vectors of the stars in the inertial space and the direction vectors of the stars in the coordinate system fixed to the body of the artificial satellite (hereinafter referred to as the spacecraft body coordinate system) which is calculated on the basis of the positions of the star images within the visual field of the star sensor.

Heretofore, it has been a conventional practice to determine at first roughly the attitude of the artificial satellite by using the attitude sensor such as an earth sensor or sun sensor and thereafter determine the attitude of the artificial satellite with high accuracy by resorting to the use of the star sensor, which makes it possible to utilize the rough values with enhanced accuracy for determining the parameters expressing the coordinate transformation or rotational motion mentioned previously. However, in the case of the artificial satellite which is equipped with neither the earth sensor nor the sun sensor, or when these sensors mounted on the artificial satellite suffer fault and can not be used, the rough value mentioned above can not be made use of in capturing initially the attitude of the artificial satellite. To cope with such situation, some measures have to be provided for enabling such rough value to be utilized.

On the other hand, when the rough value such as mentioned above is available, it is conventional practice to reduce overhead involved in the calculations required for estimation of the attitude angle by adopting linearization based on the minute-angle approximation concept. However, when the accuracy of the rough value is low or poor, error due to the approximation can no more be neglected, incurring degradation in convergence in the transient response, giving rise to a problem.

Furthermore, the artificial satellite destined for astronomical and/or terrestrial observation is required to be equipped with the attitude determination system capable of correcting drifts of a gyro with very high accuracy by utilizing the highly accurate attitude angle information available from the star sensor. However, in the conventional attitude determination system known heretofore, the drift of the gyro is regarded as being a constant or a variable of very large time constant on the presumption that the nominal angular velocity or attitude rate of the artificial satellite is constant. As a consequence, when the nominal angular velocity of the artificial satellite changes as a function of time lapse, then the time-dependent variable component of the drift in the gyro can not be estimated with sufficiently high accuracy. Thus, the attitude determination accuracy as realized is not satisfactory.

SUMMARY OF THE INVENTION

In the light of the state of the art described above, it is a general object of the present invention to provide an attitude determination system for an artificial satellite which can solve satisfactorily the problems mentioned above.

Thus, it is an object of the present invention to provide an attitude determination system for an artificial satellite which is capable of performing the star identification without need for the aid of the ground station even when the range of a star catalog to be searched can not sufficiently be narrowed because the rough value of the artificial satellite are unknown.

It is another object of the present invention to provide an attitude determination system for an artificial satellite which is capable of performing the identification of the star even when the number of stars making appearance within a visual field of a star sensor in a single image pick-up operation is short of the number of the stars required for the star identification.

Yet another object of the present invention to provide an attitude determination system for an artificial satellite which is capable of arithmetically determining rough value of the attitude of the artificial satellite without resorting to the use of other attitude sensor such as the sun sensor and/or the earth sensor.

A further object of the present invention to provide an attitude determination system for an artificial satellite, which system is capable of determining the attitude of the artificial satellite with high accuracy while reducing overhead involved in the arithmetic operations to be executed by a satellite-onboard computer and which can estimate with improved accuracy even the time-dependent variable components contained in the drift in a gyro even when the nominal angular velocity of the artificial satellite should vary as a function of time lapse.

In view of the above and other objects which will become apparent as description proceeds, there is provided according to a general aspect of the present invention an attitude determination system for an artificial satellite, which system includes an image processing module for processing star images observed at predetermined time points by a star sensor mounted on the artificial satellite for arithmetically determining direction vectors of the observed stars, a rotation estimating module for estimating a rotational motion of the artificial satellite between an attitude of the artificial satellite at a predetermined time point and an attitude of the artificial satellite at another time point, an elongation estimating module for estimating elongations between the direction vectors of plural stars the images of which are picked up at a same time point by means of the star sensor and estimating the elongations between the direction vectors of plural stars the images of which are picked up at different time points by means of the star sensor on the basis of the estimated rotational motion, a star identifying module for establishing correspondences between a plurality of the stars for which relation of the elongation has been determined and stars on a star catalog for thereby identifying the stars, and an attitude angle estimating module for estimating an attitude angle of the artificial satellite on the basis of result of the identification of the stars.

With the arrangement of the artificial satellite attitude determination system described above, identification of the stars can be realized even when the number of the stars making appearance within the visual field of the star sensor in a single-shot image pick-up operation is short of the number required for the identification. Besides, a rough value of the attitude of the artificial satellite can be arithmetically determined without resorting to the aid of other attitude sensor such as a sun sensor, earth sensor or the like.

In a preferred mode for carrying out the invention, the rotation estimating module may be so designed as to estimate an average motion of the star images on a plurality of image screens generated at image pick-up time points close to one another, to thereby establish correspondences among individual star images on a plurality of image screens generated at image pick-up time points remote from one another on the basis of the estimated average motion of the stars, for thereby estimating the rotational motion during a period intervening between the successive image pick-up time points.

By virtue of the arrangement mentioned above, the rotational motion of the artificial satellite can be estimated on the basis of the motions or displacements of the star images on the imaging screen even when information concerning the rotational motion of the artificial satellite is not furnished in advance. In addition, even when a given one of the stars makes appearance only once on the image screen because the imaging time points are discrete and spaced from one another, correspondence between the star images appearing on a plurality of the image screens and those on the star catalog can be established with high certainty.

In another preferred mode for carrying out the invention, the attitude angle estimating module may be so designed as to arithmetically determine candidates for the attitude angle at a current time point on the basis of estimated value of the rotational motion estimated by the rotation estimating module, while the star identifying module may be so designed as to provide a number of candidates for the identification of the stars on the star catalog for the observed star images. On the basis of difference between the position of the star image as picked up by the star sensor and the position of the star image predicted from the star catalog, those of the candidates for the attitude angle or those of the candidates for the identification which can not be present are sequentially eliminated as the star images are inputted from the star sensor, to thereby estimate the attitude angle of the artificial satellite on the basis of the candidate remaining to the last.

Owing to the arrangement of the artificial satellite attitude determination system mentioned above, identification of the stars and calculation of rough value of the attitude of the artificial satellite can be carried out without using the output of other attitude sensor such as the sun sensor, the earth sensor or the like or without relying on the aid of the ground station. Besides, the procedure to this end is sequentially executed upon every star image pick-up operation, load imposed on the computer can be dispersed.

In yet another preferred mode for carrying out the invention, the star identifying module may be so designed as to compare the directions of the observed stars directly with those of the stars on the star catalog to thereby extract the stars for the candidates and arithmetically determine the elongations of the observed stars and those on the star catalog relevant to the candidate stars, respectively, whereby the candidate stars for which elongations are sufficiently close to one another are outputted as the result of the identification.

With the arrangement mentioned above, the identification can be realized with imposed accuracy when compared with the identification carried out by collating only the elongations or only the direction and the brightness.

In still another preferred mode for carrying out the invention and directed to in the artificial satellite for which attitude angle information is of relatively low accuracy, the star identifying module may be so designed as to identify the corresponding star on the star catalog on the basis of the directions of plural stars observed by means of the star sensor and determining vector of difference between the directions of two of the observed stars for comparing the vector of difference between the directions of the stars on the star catalog.

With the above-mentioned arrangement, the identification can be realized with improved accuracy when compared with the identification carried out by collating only the elongations or only the direction and the brightness The present invention may be carried out in another preferred mode in which in the identification of the star by comparing the elongations among a plurality of observed stars with elongations among the stars on the star catalog, when differences between the elongations of plural stars on the star catalog as generated as the candidates for one observed star and the elongations of plural observed stars fall within an allowable error range, the star identifying module may regard the stars on the star catalog as the candidates for the observed stars to thereby combine the stars on the star catalog and the observed stars in a set and selects as secondary candidates for the observed stars the stars on the star catalog belonging to the set when the set makes appearance a number of times exceeding a predetermined value inclusive.

Owing to the above arrangement, overhead involved in the calculations required for the identification can be reduced, which in turn means that the capacity of the memory incorporated in the computer can be decreased.

In yet further preferred mode for carrying out the invention, it is proposed that when correspondence is established between a set including a plurality of vectors and a set including a plurality of other vectors containing noise as generated during a same rotational motion as the vectors, the attitude angle estimating module may be so designed as to estimate a coordinate transformation matrix between the vectors included in the sets, respectively, by first displacing one of the sets close to the other set through appropriate rotational motion and by resorting to a sequential estimating procedure for the rotational motions linking the vector set as displaced and the other vector set with rotation angle of zero being set as an initial value.

By virtue of the arrangement of the artificial satellite attitude determination system mentioned above, the solution for the estimation of the rotational motion can be determined with high accuracy without increasing overhead involved in the arithmetic operation. Accordingly, by employing a navigation filter designed to this end, it can be ensured that the estimated values of the attitude angle in the transient phase converge speedily.

According to another aspect of the invention, there is provided an attitude determination system for an artificial satellite which may be so designed that a navigation sensor signal outputted from a navigation sensor is subjected to series development operation with an orbital angular velocity of the artificial satellite and a frequency corresponding to an integral multiple of the orbital angular velocity and that a time-dependent variable component is estimated as a combination of two status quantities represented by a frequency component and a first order derivative thereof for each of the frequency components.

With the arrangement of the artificial satellite attitude determination system mentioned above, the time-invariable components and the frequency components contained in the navigation signal can dynamically be separated, which is advantageous in that the transient response of the navigation filter becomes gentle while the sensitivity to the observation noise in the steady state can be lowered. Thus, the attitude determination system ensuring high accuracy or certainty can be provided.

According to a further aspect of the invention, there is provided an attitude determination system for an artificial satellite. A plurality of navigation aiding satellites travel around the earth along different orbits, respectively, for aiding navigation of artificial satellites, wherein in a given one of the artificial satellites, message signals sent from all the operating navigation aiding satellites and carrying information concerning positions and velocities of the navigation aiding satellites are received and decoded, whereon attitude of the given one artificial satellite is roughly estimated on the basis of the position information of the navigation aiding satellites corresponding to the received message signals and the position information of the operating navigation aiding satellites which does not correspond to any one of the received message signals.

With the above arrangement of the attitude determination system, rough value of the attitude angle of the artificial satellite can be estimated even when the information of the attitude sensor such as a sun sensor, earth sensor or the like is unavailable.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 15 is a view for graphically illustrating exemplary numerical values of estimated drift of the gyro employed in the conventional artificial satellite attitude determination system.

DESCRIPTION OF THE PREFERRED EMBODIMENTS

Figure 1:
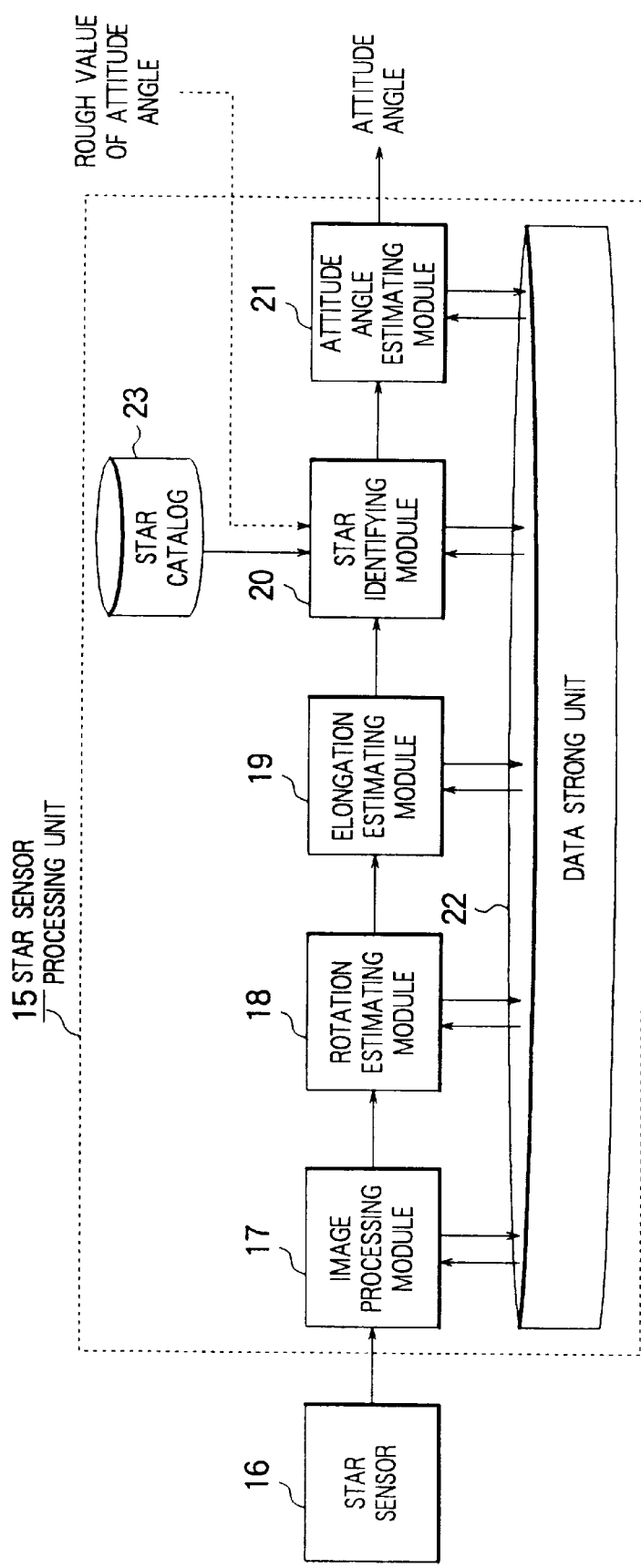
FIG. 1 is a schematic block diagram showing a system configuration of a star sensor processing unit incorporated in an artificial satellite attitude determination system according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Now, the artificial satellite attitude determination system according to a first embodiment of the invention will be described by reference to FIG. 1 which is a schematic block diagram showing a structure of a star sensor processing unit incorporated in the artificial satellite attitude determination system according to the first embodiment of the invention.

Referring to FIG. 1, a star sensor processing unit 15 is comprised of an image processing module 17 for arithmetically determining direction vectors of the stars by processing star images outputted from a star sensor 16 provided for observing the stars, a rotation estimating module 18 for estimating rotational motion of the artificial satellite on the basis of the direction vectors of the stars, an elongation estimating module 19 for estimating elongations of the stars as observed, a star identifying module 20 for establishing correspondences between the stars for which the elongation-relation has been determined and stars on a star catalog 23, an attitude angle estimating module 21 for estimating an attitude angle of the artificial satellite on the basis of the result of the star identification, and a data storage unit 22 for storing data obtained in the modules 17 to 21.

Operation of the star sensor processing unit of the above structure will be described below.

As mentioned previously, the image processing module 17 is designed to arithmetically determine or calculate the direction vectors of the stars on the basis of the output data of the star sensor, i.e., star image data. This technique itself is known in the art. By way of example, reference may be made to Izumida et al's "STRUCTURE OF ATTITUDE DETERMINATION SYSTEM BASED ON FIXED-STAR IDENTIFICATION" J67-D1, pp. 49–55 (1984). However, for the convenience of discussion, operation of the image processing module 17 will briefly be reviewed below.

The camera image containing star images as picked up by the star sensor or camera is available in the form of a table of individual picture elements or pixels having respective brightness values. This image data is digitized into binary values such that only the pixels brighter than a predetermined value are represented by logic "1" while those having brightness not higher than the predetermined value are represented by logic "0". Additionally, noise eliminating processing is performed by applying such criteria that the star image of an area smaller than a predetermined value is regarded as noise and/or the non-circular star image is disposed of as noise, etc.

For each of the remaining star images, the center, i.e., centroid is calculated. When the abscissa of the camera image is represented by xc with the ordinate thereof being represented by yc while the direction of sight is represented by zc, the direction vector pci of the i-th star having the centroid position at the coordinate point (cxi, cyi) in the camera coordinate system is given by the following expression (1):

$$pci=(cxi, cyi, sqrt (1-cxi*cxi-cyi*cyi)) \tag{1}$$

By using a coordinate transformation matrix CBC for transforming the camera coordinate system to the spacecraft body coordinate system (i.e., coordinate system fixed to body of the artificial satellite), the direction vector pbi of the i-th star on the spacecraft body coordinate system can be given by the following expression (2):

$$pbi=CBC*pci \tag{2}$$

In the expressions (1) and (2) mentioned above, the small letters c and b indicate the vector components in the camera coordinate system and the spacecraft body coordinate system, respectively.

The elongation estimating module 19 is so designed as to estimate the elongations between the direction vectors of the plural stars picked up at a same time point or at different time points. For the convenience of description, it is assumed, only by way of example, that a star s1 is picked up at a time point tB with stars s2 and s3 being caught at a time point tA. It should however be noted that the number of stars picked up at a given imaging time point may be arbitrary for enabling the estimation of the elongation.

It is further assumed that the star s1 makes appearance in the visual field of the star sensor or camera at the time point tB and disappears from the visual field at the time point tA while the stars s2 and s3 are outside of the visual field of the sensor at the time point tB and enter the visual field at the time point tA.

A method of calculating the elongation between the stars s2 and s3 picked up at a same time will be described. The direction vectors of the stars s2 and s3 are arithmetically determined by the image processing module 17 and represented by pb2(tA) and pb3(tA), respectively. Incidentally, "(tA)" indicates that the corresponding star image is picked up at the time pint tA. The elongation θ (s2, s3) can be determined in accordance with the following expression (3):

$$\theta(s2, s3)=a \cos (pb2 (tA) \cdot pb3 (tA)) \tag{3}$$

In the above expression, symbol "·" represents an operator for determining an inner product of the two vectors and "acos( )" represents an inverse cosine function. In practical applications, the star identification can equally be made even when "cos θ (s2, s3)" is employed in place of "θ (s2, s3)". In that case, calculation of "acos" is rendered unnecessary, which is advantageous in that overhead of the computer system can correspondingly be mitigated. In the latter case, "cos θ" is used in place of "θ" in the catalog data of the elongations.

Next, description will turn to a method of calculating the elongation between the stars s1 and s2 whose images were picked up at different time points. A coordinate transformation matrix indicating a change in the attitude of the artificial satellite during the period from the time point tB to the time point tA is determined by the rotation estimating module 18 and represented by CAB. The direction vector of the star s1 given by pb1(tB) in the spacecraft body coordinate system at. the time point tB is represented by pb1(tA) in the following expression (4) in the spacecraft body coordinate system at the time point tA through the coordinate transformation. Namely, $$pb1(tA)=CAB*pb1(tb) \tag{4}$$

On the basis of the relation given by the above expression (4), the elongation θ(1, 2) between the stars s1 and s2 is estimated in accordance with the following expression (5):

$$\theta(s1, s2)=acos (pb1(tA) \cdot pb2(tA)) \tag{5}$$

In the star identifying module 20, correspondences between a plurality of stars for which the elongation-relation mentioned above has been determined and the stars or elongation data contained in the star catalog 23 are established. In this conjunction, it is assumed that the estimated values of the elongations have been obtained for the stars s1, s2 and s3 as observed in the case of the instant embodiment of the invention. It should however be mentioned that the number of the stars for which the estimated values of the elongation have been determined may be arbitrary for establishing correspondence with the star catalog so far as it exceeds two. In the case where three stars have been observed, there are made available three combinations of the elongations mentioned below.

$$\theta(s1, s2), \theta(s1, s3), \theta(s2, s3) \qquad (6)$$

By contrast, the elongation data contained in the star catalog 23 or the elongation data arithmetically determined on the basis of the direction vectors of the stars listed on the star catalog amount to an enormous number, as exemplified below.

$$\theta(a, b), \theta(a, c), \theta(a, d), \ldots, \theta(b, c), \theta(b, d) \qquad (7)$$

In the case where a rough or approximate value of the attitude angle of the artificial satellite is available from other sensors such as a sun sensor, an earth sensor or the like or alternatively in the case where the rough value of the attitude angle obtained in the attitude angle determination effected one sampling cycle before is available, the range of the star catalog to be searched can be significantly narrowed. In this case, by determining such combinations of the elongations that difference between the elongation data of the stars as observed and the elongation data derived from the star catalog 23 is smaller than tolerance (or allowable error range) $\epsilon$, it is possible to make the stars listed in the star catalog 23 have correspondence to the observed stars. In more concrete, the correspondence of concern is established so that the relations or conditions given by the following expressions (8) can be met.

$$|\theta(s1, s2) - \theta(a, b)| < \epsilon$$
$$|\theta(s1, s3) - \theta(a, c)| < \epsilon \qquad (8)$$
$$|\theta(s2, s3) - \theta(b, c)| < \epsilon$$

In case there exist no other stars for which the above combinations apply valid, the stars sa, sb and sc listed in the star catalog can be determined to correspond to the observed stars s1, s2 and s3, respectively. Then, the star identification process is completed.

In the case where even the dark stars have to be made use of as the observed star(s) and as the star(s) on the star catalog or the rough value of the attitude of the artificial satellite is too inaccurate to narrow or constrict sufficiently the range of search in the star catalog, there may exist a plurality of combinations which satisfies the inequality relations or conditions mentioned above. In that case, the star identification may be carried out with high accuracy by resorting to the method described later on in conjunction with the forth or fifth embodiment of the invention.

Additionally, even when the rough values of the attitude can not be utilized, the rough attitude value of the artificial satellite can be determined by the method which will also be described hereinafter in conjunction with the third or ninth embodiment of the invention, whereon the star identification process described above can be carried out on the basis of the rough values as determined.

At this juncture, it should also be added that upon storage of the data in the data storage unit 22, identification of the stars as to whether they are identical with those observed in the past can be carried out by adopting a similar method. By way of example, the star determined as having direction vector represented by px(tB) at the time point tB must make appearance in the direction defined by the following expression (9) at the time point tA. Namely, $$px(tA) = CAB*px(tB) \qquad (9)$$

In the above expression, CAB represents the coordinate transformation matrix from the time point tB to the time point tA as determined arithmetically by the rotation estimating module 18. Of the direction vectors p1A(tA), ..., pnA(tA) of the stars observed at the time point tA, when the elongation to the direction vector px(tA) falls within the tolerance range ($\epsilon$2), then the star of the direction vector px(tA) can be decided to be identical with the star having the vector px(tB) and observed at the time point tB.

Embodiment 2

A second embodiment of the present invention will be described.

Figure 2:
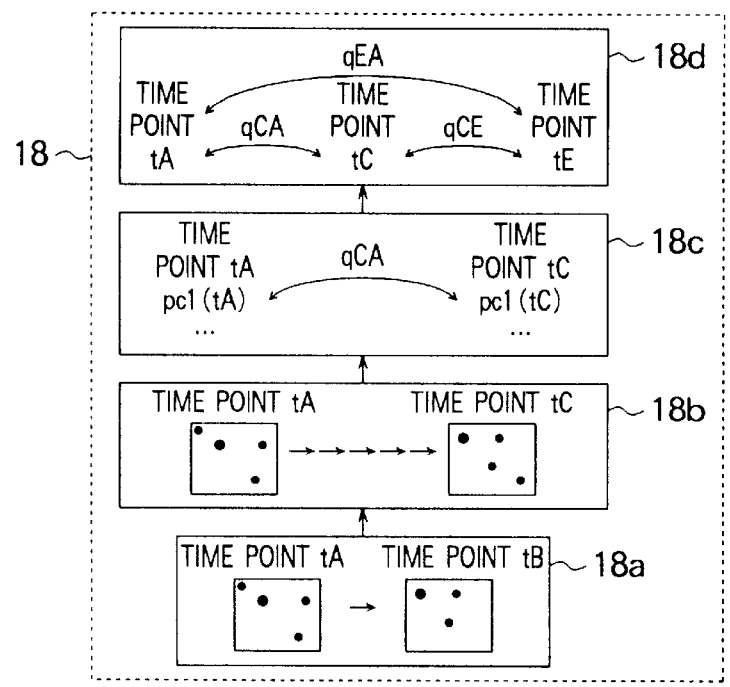
FIG. 2 is a view showing schematically a configuration of a rotation estimating module in the artificial satellite attitude determination system according to a second embodiment of the present invention.

FIG. 2 is a view showing schematically a configuration of the rotation estimating module 18 in the artificial satellite attitude determination system according to the instant embodiment of the present invention. Referring to the figure, the rotation estimating module 18 is comprised of an inter-image correspondence establishing submodule 18a for establishing correspondence between two closely adjacent pick-up images, an inter-star-image correspondence establishing submodule 18b for establishing correspondence between the star images on two slightly distanced picked-up images, a rotational motion arithmetic submodule 18c for estimating rotational motion of the artificial satellite during a period intervening between two image pick-up time points for the star images for which correspondence has been established, and a rotational motion synthesizing submodule 18d for estimating the rotational motion of the artificial satellite between two given image pick-up time points.

Description will now be directed to the operation of the rotation estimating module incorporated in the artificial satellite attitude determination system according to the instant embodiment of the invention.

Figure 3:
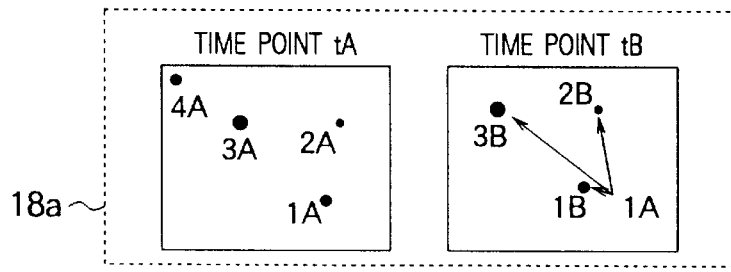
FIG. 3 is a view for illustrating operation of an inter-star correspondence establishing submodule of the artificial satellite attitude determination system according to the second embodiment of the invention.

In the inter-image correspondence establishing submodule 18a, average motion of the star images on the image screen of the camera at time points tA and tB close to each other are estimated. Because the time interval intervening between the image pick-up time points is short, the motion of the star image on the camera image screen is substantially linear and thus may be represented by a mean displacement (xBA, yBA). A method of arithmetically determining the mean displacement will be explained by reference to FIG. 3 which illustrates a method of arithmetically determining the mean displacement. More specifically, FIG. 3 is a view for illustrating operation of the inter-image correspondence establishing submodule 18a.

For the convenience of the description, it is assumed that four star images 1A, 2A, 3A and 4A make appearance at a time point tA and that three star images 1B, 2B and 3B appear at a time point tB. On this assumption, the method of determining the mean displacement (i.e., displacement on an average) will be elucidated below.

Vectors extending from the star 1A at the time point tA to all the star images 1B, 2B and 3B at the time point tB are arithmetically determined or calculated in accordance with the following expressions (10):

$$1A \rightarrow 1B: (\Delta x1B1A, \Delta y1B1A) = (cx1B, cy1B) - (cx1A, cy1A)$$
$$1A \rightarrow 2B: (\Delta x2B1A, \Delta y2B1A) = (cx2B, cy2B) - (cx1A, cy1A)$$
$$1A \rightarrow 3B: (\Delta x3B1A, \Delta y3B1A) = (cx3B, cy3B) - (cx1A, cy1A) \qquad (10)$$

A two-dimensional table G is created. Elements (i, j) in the two-dimensional table G represent the mean displacement and given by the following expression (11):

$$(i*dx+bx, j*dy+by) \quad (11)$$

In the above expression, "dx" and "dy" represent scoring widths for digitalizing the continuous displacement, and "bx" and "by" represent appropriate bias values, respectively. For a large displacement, it may be conceived to enlarge the size of the table G or increase the scoring widths dx and dy.

In the case where the information concerning the rotational motion of the artificial satellite is not available in advance at all, both the bias values "bx" and "by" in the above expression (11) are set to zero. However, when the artificial satellite is rotating about the axis known previously or when the mean displacement in the past can be referenced, the predicted values for the displacement are assigned to "bx" and "by". In the latter case, it is conceivable to decrease the size of the table G or diminish the scoring widths dx and dy when compared with the case where both "bx" and "by" are set to zero.

The vectors $(\Delta x1B1A, \Delta y1B1A)$ ... calculated for the star 1A are made discrete or digitized with the scoring widths dx and dy, whereon the values of the corresponding elements of the table G are incremented by one, respectively, the results of which can then be expressed as follows:

$$G\ G([\Delta x1B1A/dx], [\Delta y1B1A/dy]):$$

$$=G([\Delta x1B1A/dx], [\Delta y1B1A/dy])+1 \quad (12)$$

In the above expression, symbol "[ ]" represents arithmetic operation for replacing a real number with an integer approximating most closely the former. Similar processing is performed for each of the stars 2A, 3A and 4A. The value corresponding to the element (imax, jmax) having the maximum value of those contained in the table G as derived is determined as the estimated value of the mean displacement (i.e., displacement on an average), which is given by the following expression (13):

$$(imax*dx+bx, jmax*dy+by) \quad (13)$$

As the mean displacement, it is conceivable to make use of the mean value weighted with the value of the element in place of using the maximum value of the element mentioned above. By adopting the method explained in the foregoing, the mean displacement can be estimated appropriately even when the identical star can not be observed at the time points tA and tB, respectively.

In the inter-star-image correspondence establishing submodule 18b, the mean displacements of the star as determined by the inter-image correspondence establishing submodule 18a are chained together to establish correspondence between the star images appearing on the camera image screen at two image pick-up time points distanced a little from each other. For the convenience of description, it is assumed, only by way of example, that four star images 1A, 2A, 3A and 4A are picked up at a time point tA, three star images 1B, 2B and 3B are picked up at a time point tB and four star images 1C, 2C, 3C and 4C are picked up at a time point tC. On the assumption, a method of establishing correspondence between the star images at the time point tA and the star images at the time point tC will be described on the presumption that the mean displacement from the time point tA to the time point tB as well as the mean displacement from the time point tB to the time point tC has been determined by the inter-image correspondence establishing submodule 18a. It is equally possible to establish the inter-star-image correspondence by linking together an arbitrary number ($\geq 2$) of the mean displacements.

In this conjunction, the mean displacement from the time point tA to the time point tB will be represented by $(\Delta xBA, \Delta yBA)$ with the mean displacement from the time point tB to the time point tC being represented by $(\Delta xCB, \Delta yCB)$. Then, the mean displacement $(\Delta xCA, \Delta yCA)$ from the time point tA to the time point tC can be estimated in accordance with the following expression (14):

$$(\Delta xCA, \Delta yCA)=(\Delta xBA, \Delta yBA)+(\Delta xCB, \Delta yCB) \quad (14)$$

Figure 4:
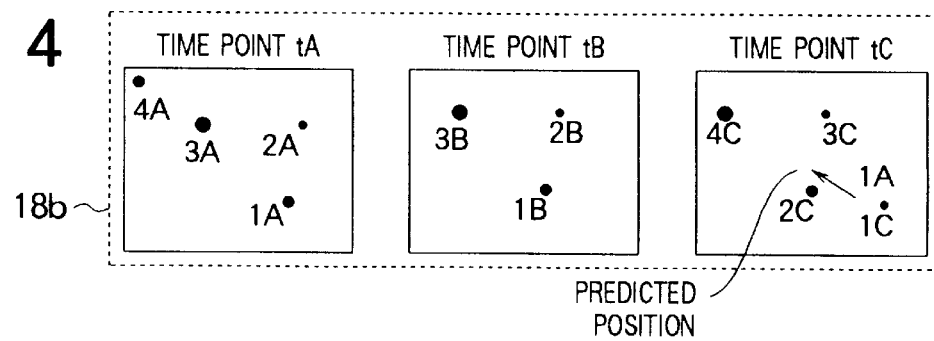
FIG. 4 is a view for illustrating operation of an inter-image correspondence establishing submodule of the artificial satellite attitude determination system according to the second embodiment of the invention.

Next, description will be made of a method for establishing correspondence between the star images viewed at the time points tA and tC, respectively, on the basis of the estimated values by reference to FIG. 4. Representing the center position of the star 1A at the time point tA by $(cx1(tA), cy1(tA))$, it can be predicted that the same star makes appearance at the position $(cx1(tA)+\Delta xCA, cy1(tA)+\Delta yCA)$ at the time point tC.

Accordingly, on the camera screen image generated at the time point tC, the star image closest to the predicted position is searched. When the distance between the star image as searched and the predicted position is smaller than a tolerance (allowable error) $\epsilon c$, this means that the correspondence can be established successfully, indicating that the same star can be viewed at different time points. Once the correspondence has been established between the star images, it becomes easy to establish correspondence between the direction vectors of that star which can be arithmetically determined on the basis of the star images thereof.

In the rotational motion arithmetic submodule 18c, there are estimated the parameters which represent the rotational motion taken place from the time point tA to the time point tC in accordance with a method described hereinafter in conjunction with a seventh embodiment of the invention on the basis of a corresponding set of the direction vector of the star at the time point tA and the direction vector at the time point tC.

The parameters employed in the instant embodiment of the invention for representing the rotational motion are known to as the Euler parameter q. The rotational motion is represented by using four Euler parameters q. More specifically, the rotational motion is defined as the rotation over an angle $\theta$ (where $0 \geq \theta \geq \pi$) about a rotation axis qv (three-dimensional vector). In view of Euler's theorem concerning the rotation of a rigid body, it is possible to express a given rotational motion with the above definition. Namely, $$q=(qv(1)* \sin(\theta/2), qv(2)* \sin(\theta/2), qv(3)* \sin(\theta/2), \cos(\theta/2)) \quad (15)$$

Properties of the Euler parameters employed in carrying out the instant embodiment of invention can be summarized as follows:

$$q \cdot q = 1 \quad (16)$$

$$qEA=qEC\#qCA \quad (17)$$

In the expression (17), symbol "#" represents an operator for a product of two Euler parameters. The expression (17) means that the Euler parameter qEA representing a rotation from A to E can be determined as a product of an Euler parameter qCA representing a rotation from A to C and an Euler parameter qCE representing a rotation from C to E. Components or terms of the expression (17) can be given by the following expressions (18):

qEA=(qEA1, qEA2, qEA3, qEA4)

qCA=(qCA1, qCA2, qCA3, qCA4)

qEC=(qEC1, qEC2, qEC3, qEC4)

qEA1=qEC4*qCA1−qEC3*qCA2+qEC2*qCA3+qEC1*qCA4 qEA2=qEC3*qCA1+qEC4*qCA2−qEC1*qCA3+qEC2*qCA4

EA3=−qEC2* qCA1−qEC1*qCA2+qEC4* qCA3+qEC3*qCA4 qEA4=−qEC1*qCA1−qEC2*qCA2−qEC3*qCA3+qEC4*qCA4  (18)

From the definition of the Euler parameters q, the under mentioned expression (19) holds true.

Conj[q]#q=q#Conj[q]=(0, 0, 0, 1)   (19)

In the above expression (19), the term "Conj[q]" represents operation of inverting the sign only of the vector parts or vector quantities of the Euler parameters q.

In the rotational motion synthesizing submodule 18d, the parameters of the rotational motion as determined by the rotational motion arithmetic submodule 18c are chained or linked together to estimate the rotational motion of the artificial satellite between a given time point in the past and the present or current time point. Only for the illustrating purpose, description will be made of a method for estimating the parameter qEA for the rotational motion from the time point tA to the time point tE on the assumption that the parameter qEC for the rotational motion from the time point tA to the time point tC and the parameter qEC for the rotational motion from the time point tC to the time point tE have been determined by the rotational motion arithmetic submodule 18c.

In view of the properties of the Euler parameters, the rotational motion parameter qEA mentioned above can be determined in accordance with the following expression (20):

qEA=qEC#qCA   (20)

The rotational motion parameter can be calculated equally for an interval between given time points which do not coincide with the image pick-up time point. By way of example, let's consider determination of parameter qGA for the rotational motion from the time point tA to a time point tG=(tA+tC)/2. In that case, by making use of the undermentioned expression (21), appropriate scale translation of the rotation angle may be performed in accordance with the expression (22) mentioned below:

qCA=(q1* sin (θ/2), q2* sin (θ/2), q3* sin (θ/2), cos (θ/2))   (21)

qGA=(q1* sin (θ/4), q2* sin (θ/4), q3* sin (θ/4), cos (θ/4))   (22)

It should be added that as a method of synthesizing or combining the rotational motions, there may be adopted a method resorting to the use of direction cosine matrix or a method in which Euler's angle is used in place of the method disclosed above.

Embodiment 3

Figure 5:
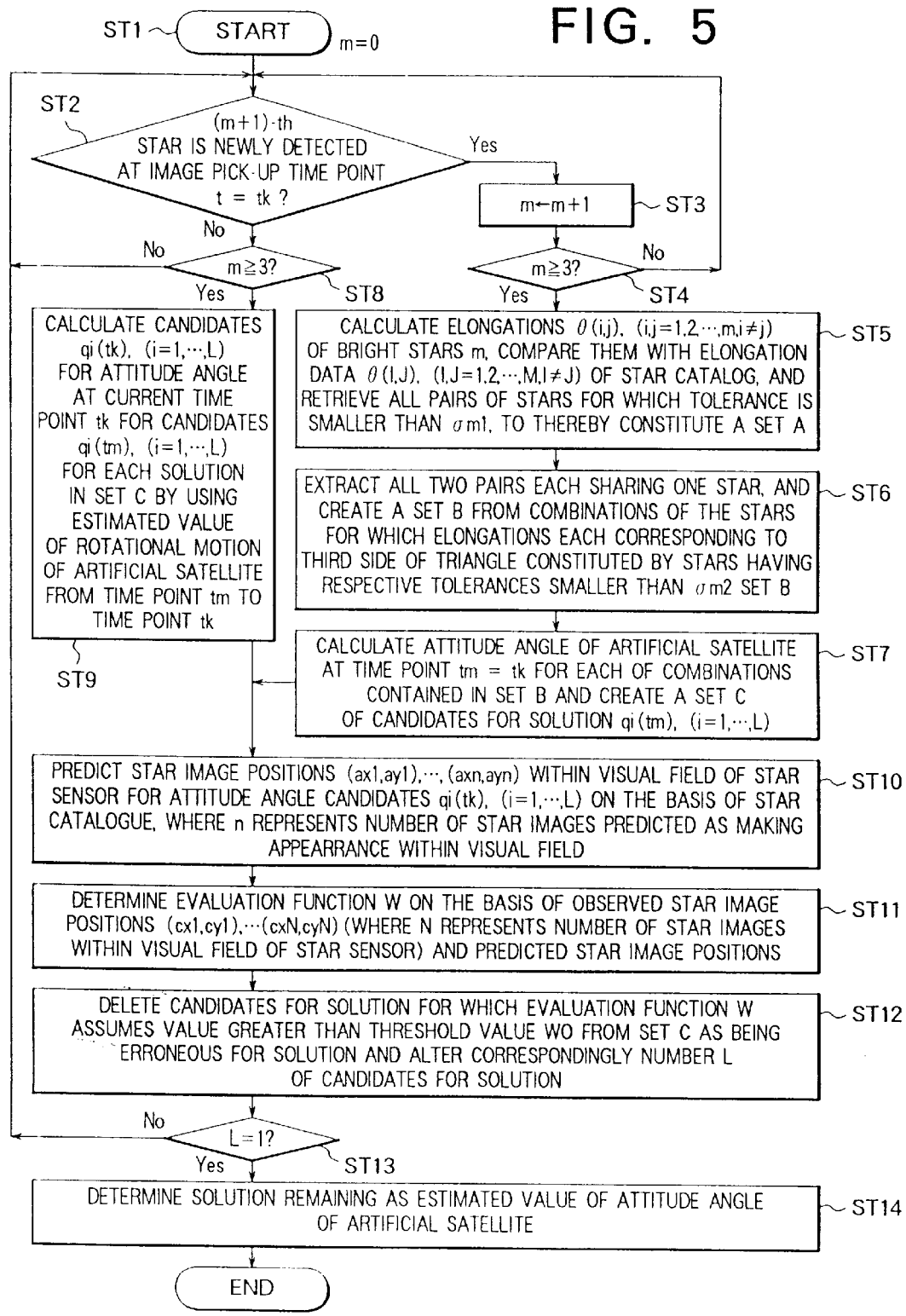
FIG. 5 is a flow chart for illustrating operations of a star identifying module and an attitude angle estimating module of the artificial satellite attitude determination system according to a third embodiment of the invention.

A third embodiment of the present invention will be described by reference to FIG. 5 which is a flow chart for illustrating operations of the star identifying module 20 shown in FIG. 1.

The detected bright star number (i.e., the number of bright stars as detected) m is reset to zero initially in step ST1. In a step ST2, it is checked whether any bright star differing from the stars observed in the past has been newly detected by processing the observation values outputted from the star sensor. In case it is decided that no bright star has been detected or the bright star is identical with that observed in the past, the processing proceeds to a step ST8. On the other hand, when any bright star has been detected newly, the processing proceeds to a step ST3.

In the step ST3, the bright star number m is incremented by one to thereby update the value of the number m. When it is found in a step ST4 that the bright star number m is smaller than three, the step ST2 is resumed, while when the value of the number m is greater than three inclusive, the processing proceeds to a step ST5 where the elongations θ(i,j), (i,j=1, 2, . . . , m, i≠j) of the bright stars m are determined to be subsequently compared with the elongation data θ(I,J), (I,J=1, 2, . . . , M, I≠J) of the star catalog, whereby all the pairs of the stars for which allowable error is smaller than σm1 are retrieved to constitute a set A.

In a step ST6, two pairs each sharing one common star are all extracted, whereon combinations of the stars for which the elongations each corresponding to a third side of a triangle constituted by the stars have respective tolerances (allowable errors) smaller than σm2 are selected as the members constituting a set B. In a step ST7, the attitude angle of the artificial satellite at a time point tm=tk is arithmetically determined for each of the combinations contained in the set B, respectively, whereon a set C containing the attitude angles as the candidates for the solution qi(tm), (i=1, . . . , L) (where L represents the number of the solutions) is created.

In a step ST8, when the bright star number m is smaller than three, return is made to the step ST2, whereas when the number m is greater than three inclusive, the processing proceeds to a step ST9 where the candidates qi(tk), (i=1, . . . , L) for the attitude angle at the current time point tk are arithmetically determined for the candidates qi(tm), (i=1, . . . , L) for the solutions of the set C on the basis of the estimated value of the rotational motion of the artificial satellite from the time point tm to the time point tk.

In a step ST10, star image positions (ax1, ay1), . . . , (axn, ayn) within the visual field of the star sensor are predicted for the attitude angle candidates qi(tk), (i=1, . . . , L), respectively, where n represents the number of the star images predicted as making appearance within the visual field. In a step ST11, an evaluation function W is determined on the basis of the observed star image positions (cx1, cy1), . . . , (cxN, cyN) (where N represents the number of the star images appearing within the visual field of the star sensor) and the predicted star image positions.

In a step ST12, the candidates for the solution for which the evaluation function W assumes a value greater than a threshold value W0 are deleted from the set C as being erroneous for the solution and the number L of the candidates for the solution is altered correspondingly. In this context, the evaluation function W may be given, for example, by the following expression (23):

$$W=(ax1-cx1)*(ax1-cx1)+(ay1-cy1)*(ay1-cy1)$$
$$\ldots +\ldots +(ayn-cyn)*(ayn-cyn) \qquad (23)$$

Incidentally, in the calculation in accordance with the above expression (23), it is necessary to establish correspondence of the observed star images to the predicted star images, respectively. To this end, it may be conceived that for the predicted star image (ax1, ay1), the star image of those observed 1, . . . , N which satisfies the condition given by the following expression and which makes the value of the left side member be minimum can establish the correspondence.

$$(ax1-cxi)*(ax1-cxi)+(ay1-cyi)*(ay1-cyi)<(tolerance)$$

When it is decided in the step ST13 that the number L of the candidates for the solution is equal to one, then the processing proceeds to a step ST14. If otherwise, return is made to the step ST2. The solution remaining finally in the processing step ST14 is the estimated value of the attitude angle of the artificial satellite.

With the identification method according to the instant embodiment of the invention, the visual field of the sensor can be enlarged in the equivalent sense by utilizing for the identification the images of the star sensor at a plurality of time points or in different attitudes, whereby restriction otherwise imposed by the visual field of the star sensor itself can be mitigated or avoided while the probability of the bright stars making appearance within the visual field can be significantly increased.

In this way, the stars to be registered in the star catalog used for the identification can be limited to the bright stars. Consequently, the size of the star catalog to be collated or referenced upon identification can be decreased with overhead involved in the computational calculation being correspondingly reduced, to ensure the identification of the star only with the onboard computer on the basis of only the output of the star sensor without relying on the other attitude sensor or the ground station.

In the foregoing, the bright star number m must be greater than three inclusive to proceed to the step ST5. However, similar effects can be obtained by skipping the step ST6 and decreasing the threshold value in the steps ST4 and ST8 from three to two. In this case, the set A is used in place of the set B in the step ST7.

Embodiment 4

Next, operation of the artificial satellite attitude determination system according to a fourth embodiment of the present invention will be described by reference to a flow chart shown in FIG. 6. The instant embodiment is directed to the artificial satellite in which available attitude angle information is relatively poor in accuracy. More specifically, FIG. 6 is a flow chart for illustrating the operation of the star identifying module 20 which is designed to extract the candidate stars by comparing the directions of the observed stars directly with the stars on the star catalog in the artificial satellite whose attitude angle information is comparatively low in respect to the accuracy, whereon for the candidate stars, elongations of the observed star and the stars on the star catalog, respectively, are calculated to thereby identify the star for which the elongations are sufficiently small.

Figure 6:
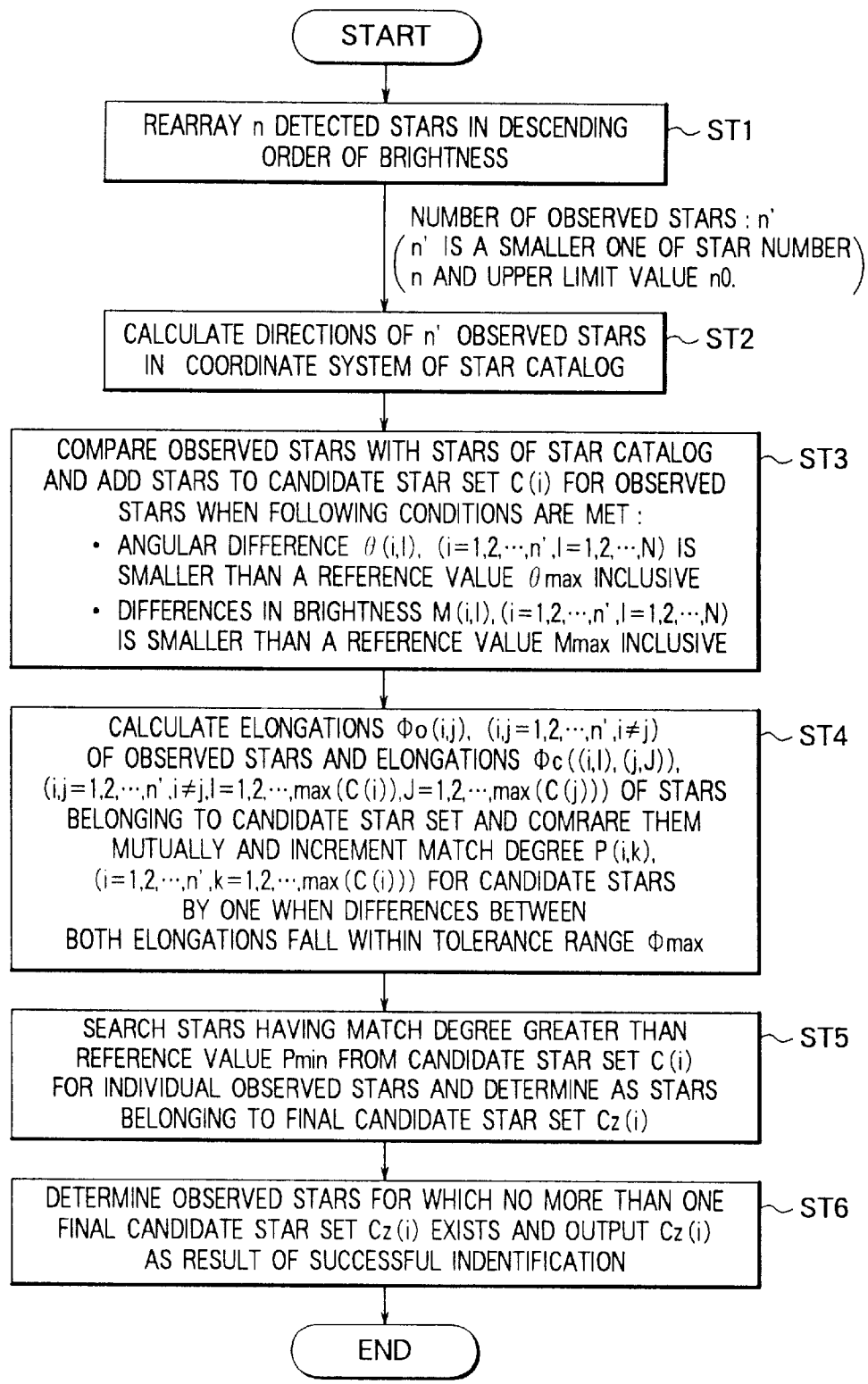
FIG. 6 is a flow chart for illustrating operation of a star identifying module of the artificial satellite attitude determination system according to a fourth embodiment of the invention.

At first, in a step ST1 shown in FIG. 6, data of n detected stars So(i), (i=1, 2, . . . , n) are inputted which are then rearrayed in the descending order of brightness. Of the detected stars, the number n' of the observed stars which are to undergo the processing in a step ST3 et seq. is a smaller one of the star number n and the upper limit star number n0. In this conjunction, the upper limit of the star number may be set to fall within a range of five to ten (i.e., to be greater than three required for the perfect identification).

Next, in a step ST2, the directions of n' observed stars are transformed onto the coordinate system on the star catalog by using the information concerning the longitude of ascending node, inclination of orbit, latitude argument and the estimated value of the attitude angle. In the step ST3, the observed stars are compared with the stars on the star catalog. However, the stars on the star catalog which are to undergo the comparison are selected to be those Sc(I), (I=1, 2, . . . , N) which are considered as having the possibility of being detected in view of the directions thereof.

For each of the stars Sc(I) on the star catalog, the angular differences $\theta(i, I)$, (i=1, 2, . . . , n', I=1, 2, . . . , N) from the detected stars are determined and additionally the differences in the brightness between the detected stars and the stars on the star catalog are determined, respectively, whereon those stars Sc(I) of the star catalog for which the angular difference is smaller than a reference value $\theta$max inclusive which depends on the accuracy of the attitude determination and that of the orbit estimation and for which the differences in brightness M(i, I), (i=1, 2, . . . , n', I=1, 2, . . . , N) is smaller than a reference value Mmax inclusive which depends on the accuracy of brightness of the star sensor are added to the candidate star set C(i).

In a step ST4, the elongations $\Phi o(i,j)$, (i,j=1, 2, . . . , n', i≠j) of the observed stars and the elongations $\Phi c((i,I), (j,J))$, (i,j=1, 2, . . . , n', i⊕j, I=1, 2, . . . , max(C(i)), J=1, 2, . . . , max(C(j))) of the stars belonging to the candidate star set are determined for mutual comparison. In precedence to the comparison, the initial values for the match degree P(i,k), (i=1, 2, . . . , n', k=1, 2, . . . , max(C(i))) are reset to zero. For the candidate stars for which the difference between the elongations of the observed stars and the elongations of the stars on the star catalog is smaller than the tolerance 101 max inclusive which depends on the position observation accuracy of the star sensor, the match degree P(i, k), (i=1, 2, . . . , n', and k=1, 2, . . . , max(C(i))) is incremented by one.

In a step ST5, the stars having the match degree greater than the reference value Pmin are registered as the stars belonging to the final candidate star set Cz(i). Parenthetically, the reference value Pmin is so set as to fall within the range greater than one inclusive and smaller than the number of the observed stars. When it is found in a step ST6 that no more than one member exists for the individual observed stars in the final candidate star set Cz(i), then that one member is outputted as the result of the identification.

Embodiment 5

Figure 7:
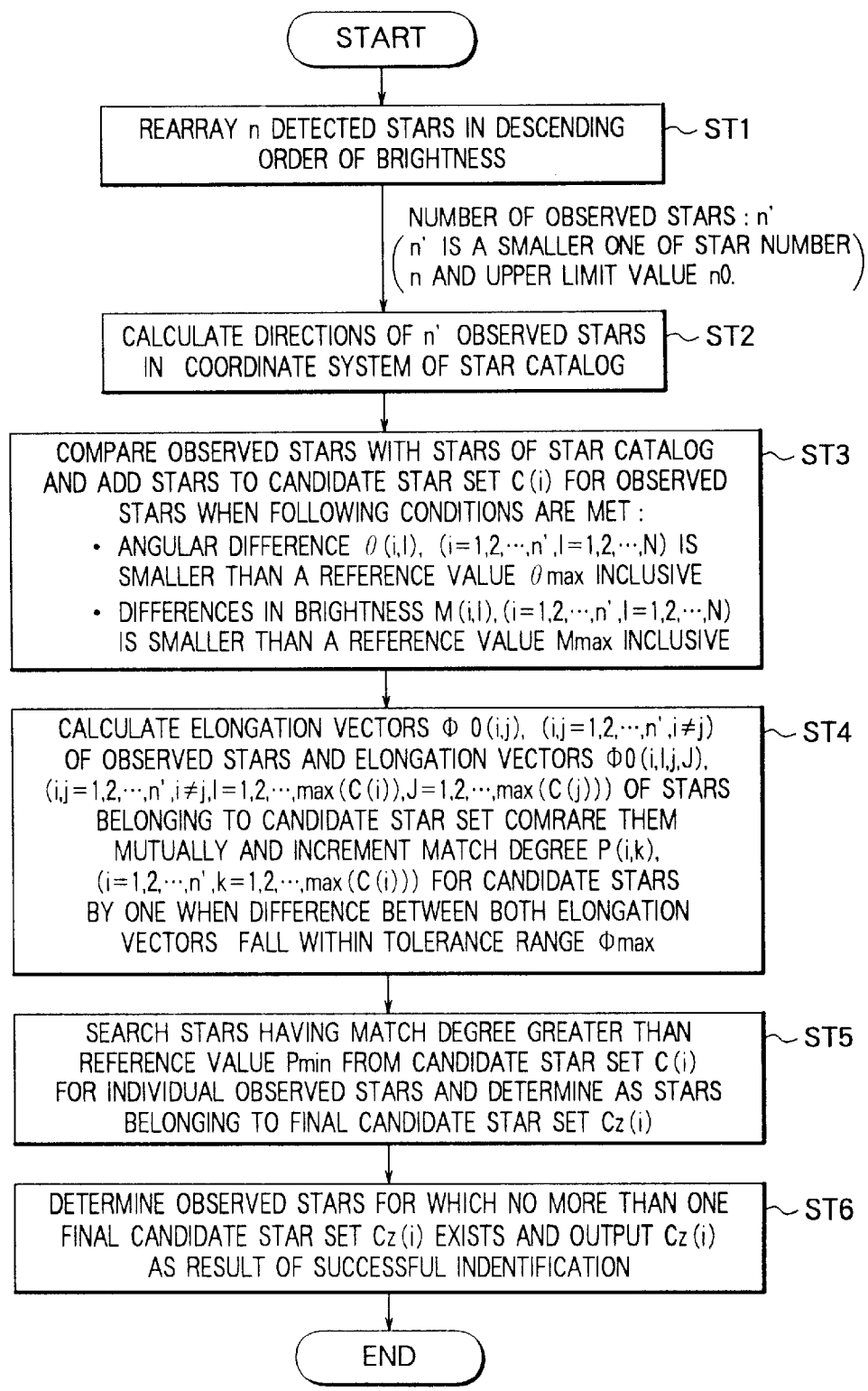
FIG. 7 is a flow chart for illustrating operation of a star identifying module of the artificial satellite attitude determination system according to a fifth embodiment of the invention.

A fifth embodiment of the present invention will be described by reference to FIG. 7 which shows a flow chart for illustrating operation of the star identifying module 20 for identifying the stars on a corresponding star catalog on the basis of the directions oriented to a plurality of stars observed by the star sensor in the artificial satellite the attitude angle information of which is relatively poor in accuracy by determining the vector of difference in the direction between two of the observed stars and comparing the difference vector with the vector of difference in the direction between the stars on the star catalog.

The processings up to the step ST3 are same as in the case of the fourth embodiment. In a step ST4, elongation vectors $\Phi 0(i, j)$, $(i, j=1, 2, \ldots, n', i \neq j)$ of the observed stars and elongation vectors $\Phi 0(i, I, j, J)$, $(i, j=1, 2, n', i \neq j, I=1, 2, \ldots, \max(C(i)), J=1, 2, \ldots, \max(C(j)))$ of the stars belonging to the candidate star set are determined, whereon elongation vector differences $\Phi(i, I, j, J)$ are determined in accordance with the following expressions:

$$\Phi 0(i, j) = CIB * pBi - CIB * pBj \qquad (24)$$

$$\Phi 0(i, I, j, J) = pI(i, I) - pI(j, J) \qquad (25)$$

$$\Phi(i, I, j, J) = \Phi 0(i, j) - \Phi 0(i, I, j, J) \qquad (26)$$

In the above expressions, symbols pBi and pBj represent direction vectors of the observed stars i and j, respectively, in the spacecraft body coordinate system, and CIB represents a coordinate transformation matrix for transforming the spacecraft body coordinate system into the catalogue coordinate system. Further, pI(i, I), pI(j, J) represent the direction vectors on the star catalog of the star candidates I, J for identifying the observed stars i, j, respectively.

The above description has been made on the assumption that the elongation vectors are the direction vector of the stars, i.e., three-dimensional. However, the difference of the elongation vector can be determined through a similar procedure even when the elongation vectors are oriented on the screen, i.e., two-dimensional. For the candidate stars for which the magnitude of the elongation vector differences are not greater than tolerance $\Phi$max, the match degrees thereof, i.e., $P(i, k)$, $(i=1, 2, \ldots, n', k=1, 2, \ldots, \max(C(i)))$, are each incremented by one. Incidentally, the tolerance $\Phi$max depends on the positional observation accuracy and the attitude determination accuracy of the star sensor. The processings following the step ST5 inclusive are same or those in the fourth embodiment of the invention.

Embodiment 6

Operation of the attitude determination system according to a sixth embodiment of the invention will be described by reference to FIG. 8 which shows a flow chart for illustrating the operation of the star identifying module 20 which is generally so designed as to perform the star identification by comparing the elongations among a plurality of observed stars with the elongations of the stars on the star catalog in the initial attitude determination of the artificial satellite having no attitude information. In that case, because a large number of the candidate stars make appearance for one observed star, the number of times the elongation is matched for each of the candidate stars is recorded to thereby select as the secondary candidates only the stars the elongations of which have undergone the collating or matching process many times.

Figure 8:
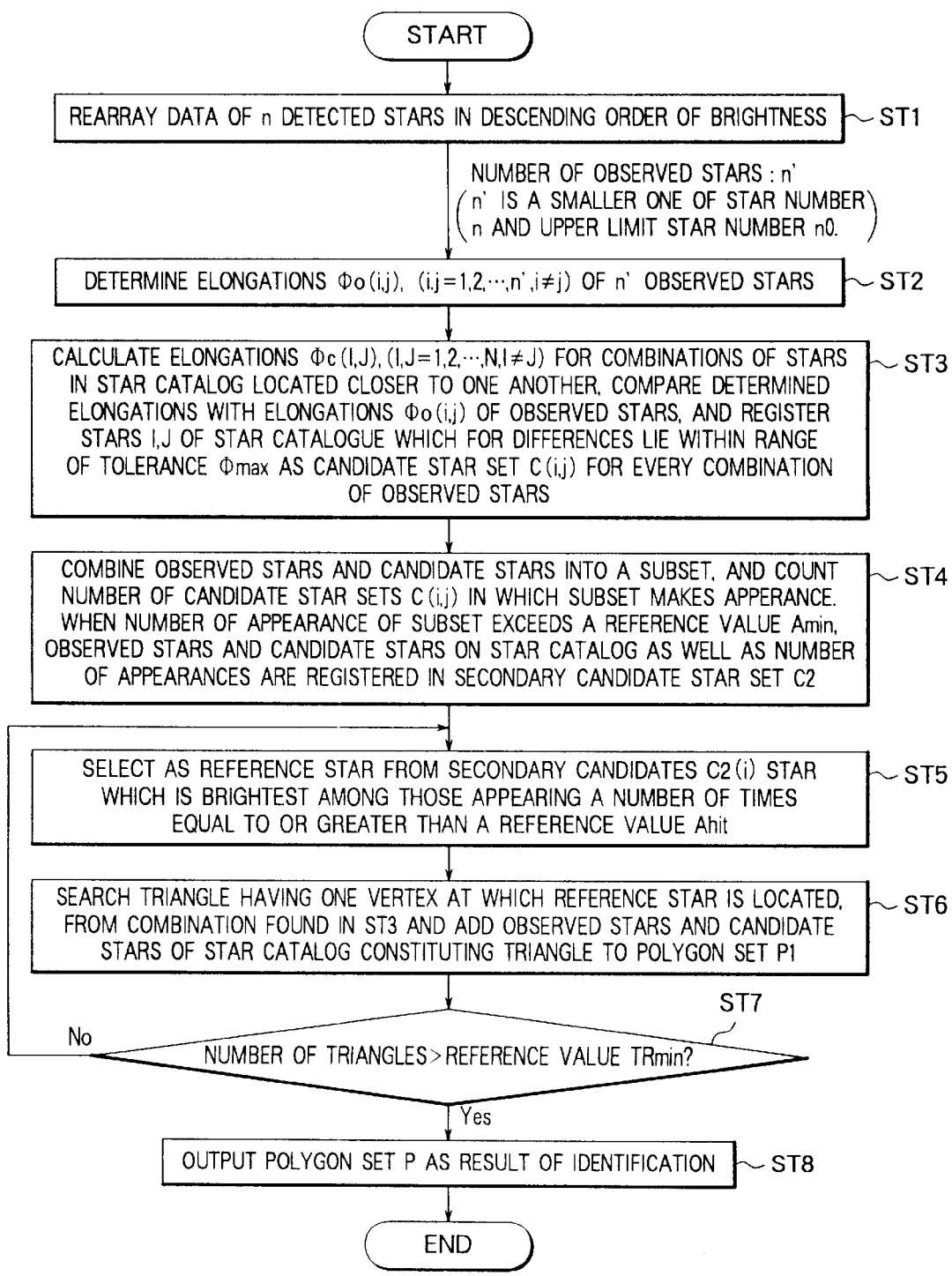
FIG. 8 is a flow chart for illustrating operation of a star identifying module of the artificial satellite attitude determination system according to a sixth embodiment of the invention.

In a step ST1 shown in FIG. 8, data of n detected stars So(i), $(i=1, 2, \ldots, n)$ are inputted, which are then rearrayed in the descending order of brightness. Of the detected stars, the number n' of those to undergo the processing in the step ST1 et seq. is a smaller one of the star number n and the upper limit star number n0. In this conjunction, the upper limit of the star number is so selected as to fall within a range of five to ten (i.e., to be greater than three required for the perfect identification).

In a step ST2, the elongations $\Phi o(i,j)$, $(i,j=1, 2, \ldots, n', i \neq j)$ of the observed stars is determined. In a step ST3, the elongations $\Phi c(I,J)$, $(I,J=1, 2, \ldots, N, I \neq J)$ are calculated for the combinations of those of N stars on the all-sky star catalog which are located angularly closer to one another than the maximum angle of the visual field of the star sensor, whereon the elongations as determined are compared with the elongations $\Phi o(i, j)$ of the observed stars.

When differences between the elongations of the observed stars and the elongations of the stars on the star catalog lie within the range of tolerance $\Phi$max, the stars I, J on the star catalog are added to the candidate star set C(i, j) of the observed stars i, j. This means that both stars I and J of the star catalog can be regarded as the candidate not only for the observed star i but also for the observed star j.

In a step ST4, the observed stars and the candidate stars on the star catalog as registered in the step ST3 are combined into a subset, whereon the number of the candidate star sets C(i, j) in which the subset makes appearance is counted. When the number of the appearances is greater than a reference value Amin, the observed stars and the candidate stars on the star catalog as well as the number of the appearances mentioned above are registered in the secondary candidate star set C2(i), $(i=1, 2, \ldots, n')$. Incidentally, the reference value Amin mentioned above is so selected as to be a value falling within a range greater than two, inclusive, and smaller than the number of the observed stars so that the stars which happen to be contained in the candidates and bear no relation can be eliminated.

In a step ST5, a reference star is selected from the secondary candidates C2(i). The star selected as the reference star is the one which is brightest among those the appearance number of which are equal to or greater than a reference value Ahit. The reference value Ahit is selected greater than the reference value Amin and smaller than the number of the observed stars.

Subsequently, in a step ST6, a triangle having one vertex at which the reference star is located is searched. More specifically, by searching two members or elements of the candidate star set C(i, j) which includes the reference star, two sides of the triangle extending from the vertex or the reference star can be extracted. Accordingly, when a combination constituting the remaining one side of the triangle is included in the candidate star set C(i, j), the triangle under search can be determined. The observed stars and the candidate stars on the star catalog which constitute the triangle including the reference star as searched are added to a polygon set P1.

When the identifications of the stars corresponding to two common vertexes in forming the triangle differ from each other, then the combination of such identification is additionally defined as a new polygon set Pk, $(k=1, \ldots)$. Upon completion of the search, the polygon set including a greatest number of triangles is selected to be outputted from the step ST6.

In a step ST7, decision is made as to whether or not a sufficient number of triangles could be searched in the step ST6. When the number of the triangles is smaller than a reference value TRmin inclusive, then it is decided that the reference star is improper. In that case, the processing starting from the step ST5 is executed again for another reference star. On the other hand, when the number of the triangles is greater than the reference value TRmin, it is then determined that the identification has been carried out successfully, whereupon a step ST8 is executed. Parenthetically, the reference value TRmin for the number of the triangles is selected to fall within a range of $1 \geq TRmin < n' (n'-1)(n'-2)/6$.

In a step ST8, the polygon set P is outputted as the result of the identification. In that case, the individual vertexes of the polygon represent the correspondences between the observed stars and the candidate stars on the star catalog.

Embodiment 7

Next, description will be made of a seventh embodiment of the invention by reference to FIG. 9 which shows a flow chart for illustrating operations of the attitude angle estimating module 21 shown in FIG. 1 and the rotational motion arithmetic submodule 18c shown in FIG. 2.

Before entering into description of the processing procedure, it will first be briefly considered how to derive the expressions shown in the flow charts. In the attitude angle estimating module 21, it is required to determine the rotational motion or coordinate transformation between a set of direction vectors of the stars in the spacecraft body coordinate system and a set of direction vectors of the stars in the inertial coordinate system.

On the other hand, in the rotational motion arithmetic submodule 18c, it is required to determine the rotational motion or the coordinate transformation between a set of direction vectors of the stars observed at a certain time point and a set of direction vectors of the stars observed at another time point. In this context, it is to be noted that the attitude angle estimating module 21 and the rotational motion arithmetic submodule 18c share a common feature in that a set of plural vectors is made to have correspondence to another set of plural vectors through the same rotational motion or coordinate transformation.

For the illustrative purpose, description will be directed to the operation of the attitude angle estimating module 21.

It is assumed that a set of the direction vectors pb1, pb2, ..., pbn of the observed stars are identified as a set of the direction vectors pI1, pI2, ..., pIn of the stars on the star catalog, respectively. In this context, letter "b" indicates the associated vector components belonging to the spacecraft body coordinate system while letter "I" indicates those belonging to the inertial coordinate system. Further, n represents the number of the stars as identified. When the Euler parameters expressing the coordinate transformation from the spacecraft body coordinate system to the inertial coordinate system is represented generally by q, the direction vector of the i-th star can be expressed as follows:

$$pIi = Conj[q] \# pbi \# q + vi, (i=1, \ldots, n) \quad (27)$$

In the above expression, vi represents error such as observation noise or the like. Parenthetically, according to the method incarnated in the instant embodiment, the three-dimensional vector pIi is read conveniently as the four-dimensional vector [pIi, 0] to perform the operation "#".

In an attempt for minimizing the error, there is adopted an evaluation function V given by the following expression:

$$V = 1/2 * E vi \cdot vi \quad (28)$$

In the above expression, symbol "E" represents summation of values of i=1, ..., n. As a method of minimizing the evaluation function such as mentioned above, there may be mentioned typically the Newton method, according to which the solution which can minimize the evaluation function is repeatedly determined by calculation.

The Euler parameter q is composed of four components, three of which are independent components. Accordingly, vector term qv is assumed as independent variable. When the estimated value obtained by the calculation repeated k times is represented by qv(k), the estimated value qv(k+1) derived from the (k+1)-th calculation can be given by the following expressions:

$$qv(k+1) = qv(k) + \Delta qv \quad (29)$$

$$H * \Delta qv = -J \quad (30)$$

$$J = -\partial/\partial qv (V) \quad (31)$$

$$H = -\partial/\partial qv (J) \quad (32)$$

In the above expressions, notation $\partial/\partial qv$ () represents partial differentiation of the parenthesized variables for the vector term qv. When the partial differentiations are to be realized intact, equations as involved become considerably complex, involving a large amount of overhead for the calculation. Besides, when the norm of the vector term qv approximates to one "1", the components J and H become excessively large, which may lead to the possibility that the calculation based on the Newton method may diverge.

Such being the circumstances, the Euler parameter q(k) obtained from the estimated value qv(k) resulting from the k-th repetitive calculation is used for the coordinate transformation of pIi, (i=1, ..., n) to thereby obtain pBi. Namely, $$pBi = q(k) \# pIi \# Conj[q(k)] \quad (33)$$

Thus, the following expression (34) applies valid:

$$pBi = q(k) \# Conj[q] \# pbi \# q \# Conj[q(k)]$$
$$+ q(k) \# vi \# Conj[q(k)], (i=1, \ldots, n) \quad (34)$$

As the quantity q(k) is closer to the truth value q, the values of pBi and pbi become substantially equal to each other. In that case, because q # Conj [q(k)] is approximately equal to identical transformation, i.e., (0, 0, 0, 1), estimation of "q # Conj [q(k)]" can be performed by using qv=(0, 0, 0) as the initial value.

By performing the coordinate transformation upon every repetition in the sequential calculation procedure mentioned above, the initial value can be set to qv=(0, 0, 0) upon every estimation, whereby qv can be expressed in a simple form as mentioned below.

$$\Delta qv = -0.5 * inv(H) * J \quad (36)$$

$$J = E(pbi \times pBi) \quad (37)$$

$$H = E\{(pbi \cdot pbi) * E - pbi * Tr[pbi]\} \quad (38)$$

In the above expressions, symbol "inv()" represents an operator indicating an inverse matrix, symbol "X" represents an operator indicating a vector product, a symbol "E" represents a unit matrix, symbol "Tr[ ]" represents an operator indicating vector transposition.

Figure 9:
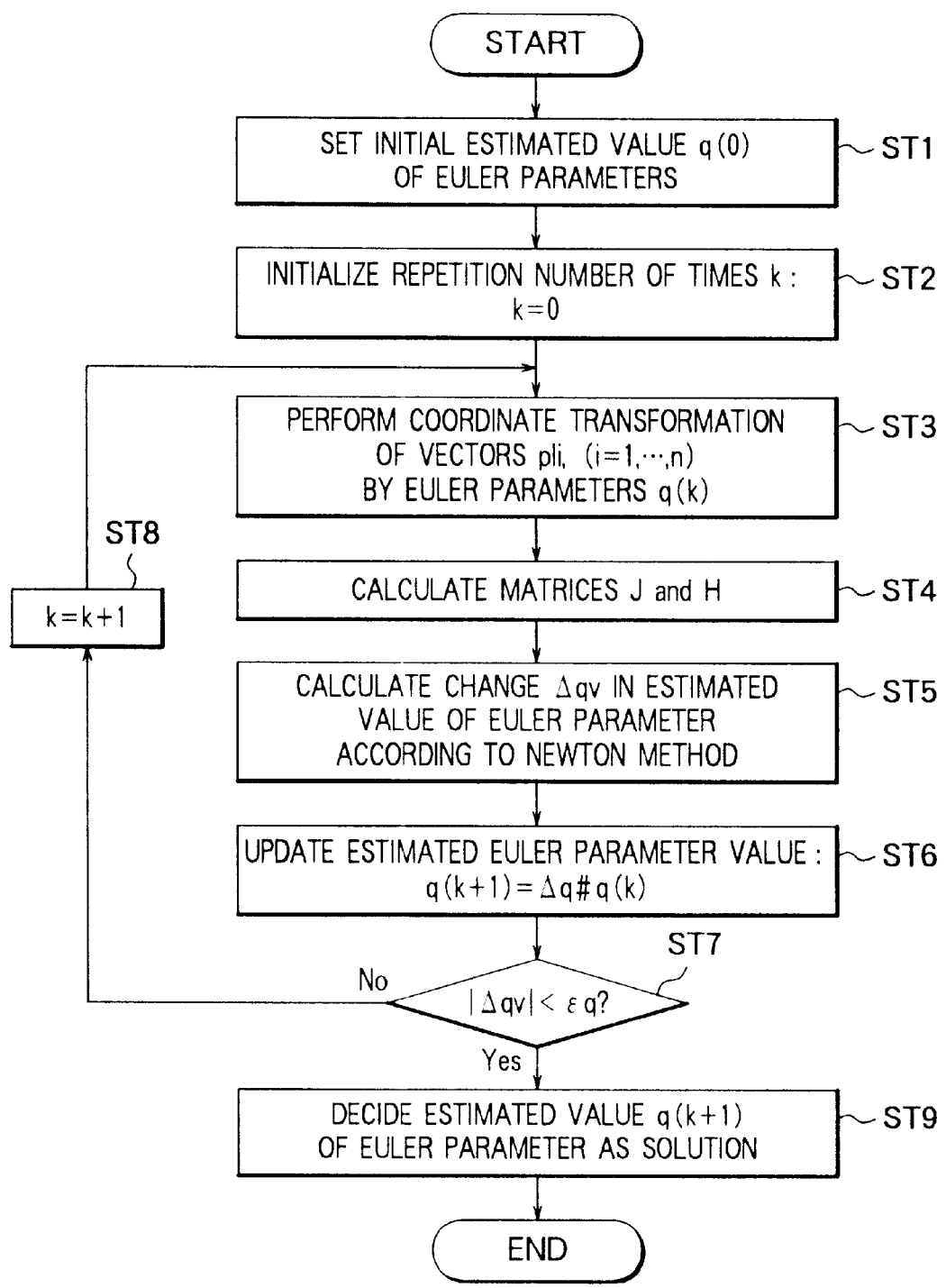
FIG. 9 is a flow chart for illustrating operations of an attitude angle estimating module and a rotational motion arithmetic submodule in the artificial satellite attitude determination system according to a seventh embodiment of the invention.

The algorithms described above are summarized in the flow chart shown in FIG. 9.

Referring to FIG. 9, in a step ST1, the initial estimated value q(0) of the Euler parameter is set. As a method of estimating the initial estimated value, it can be conceived, for example, to determine a coordinate transformation matrix between an orthogonal coordinate system generated from pb1 and pb2 and an orthogonal coordinate system generated from pI1 and pI2 to thereby set the Euler parameter corresponding to the obtained coordinate transformation matrix as the initial value q(0).

Alternatively, a coordinate transformation matrix may be determined by multiplying a pseudo inverse matrix composed of a row of pb1, pb2, ..., pbn by a row of pI1, pI2, ..., pIn, starting from the rightmost direction vector, whereon the Euler parameter corresponding to the coordinate transformation matrix as obtained is set as the initial value q(0).

In a step ST2, the repetition number k is initialized to zero. In a step ST3, the coordinate transformation of the vectors pIi, (i=1, ..., n) by the Euler parameter q(k) is performed. In a step ST4, matrices J and H are determined.

In a step ST5, a change Δqv in the estimated value of the vector term of Euler parameter is calculated. In a step ST6, the estimated Euler parameter value is updated. In a step ST7, the norm of the change Δqv in the vector term of the estimated Euler parameter value is compared with the tolerance or allowable error εq. When the former is smaller than the latter, the processing proceeds to a step ST9. On the other hand, in case the former is greater than the latter inclusive thereof, the processing proceeds to a step ST8.

In the step ST8, the value of k is incremented by one to be thereby updated, whereon the step ST3 is resumed. In the step ST9, the estimated value q(k+1) of the Euler parameter is decided as the solution of concern.

In the system for estimating the attitude angle of the artificial satellite according to the instant embodiment of the invention, the three-dimensional rotational motion is expressed by using the Euler parameters, whereby the sequential or serial calculation process can be simplified while maintaining the non-linear characteristics of the rotational motion. Thus, even when the rough value of the attitude angle of the artificial satellite used as the initial value in the sequential calculations is relatively poor in accuracy, the calculations can converge to the solution of high accuracy at high speed.

Embodiment 8

Next, an eighth embodiment of the invention will be described by reference to FIG. 10 which is a block diagram showing a configuration of an attitude determination system for an artificial satellite in which a gyro and a star sensor are used in combination.

Figure 10:
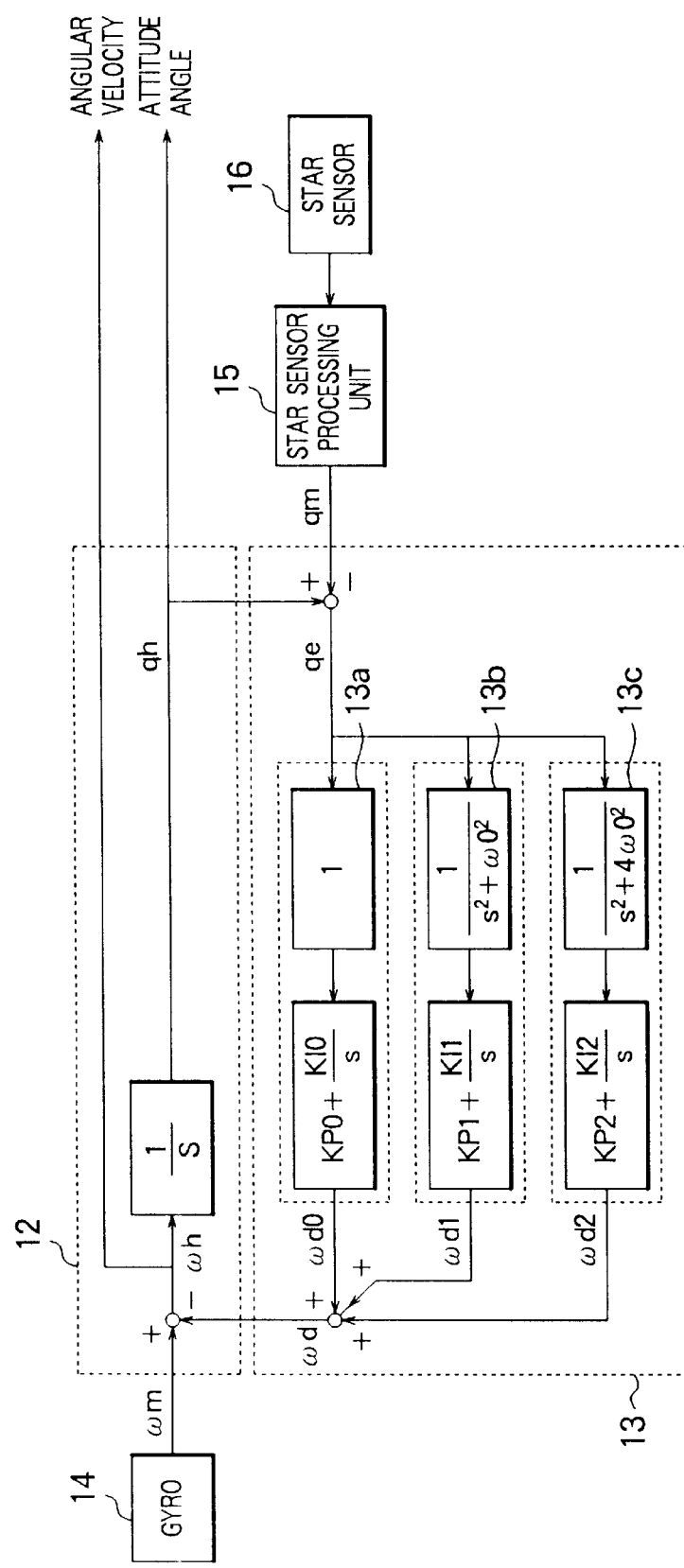
FIG. 10 is a block diagram showing a system configuration of an attitude determination system for an artificial satellite in which a gyro and a star sensor are used in combination according to an eighth embodiment of the invention.
Figure 14:
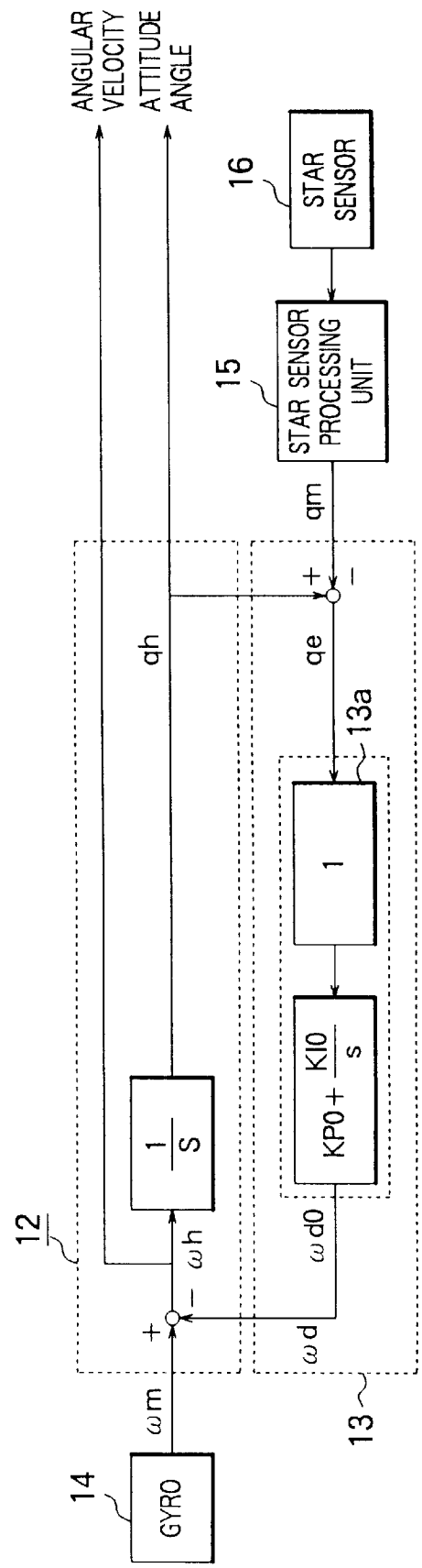
FIG. 14 is a block diagram showing a typical configuration of the conventional artificial satellite attitude determination system equipped with a gyro and a star sensor in combination.

In FIG. 10, components or modules shown in FIG. 14 are denoted by like reference characters and repeated description thereof is omitted.

The attitude updating unit 13 in the system according to the instant embodiment includes a basic frequency drift estimation module 13b and a secondary frequency drift estimation module 13c in addition to the conventional time-invariable drift estimation module 13a.

Operation of the attitude determination system according to the instant embodiment will be described.

The output signal of the star sensor 16 is processed by the star sensor processing unit 15 to obtain an observed value qm of the attitude angle of the artificial satellite. The attitude propagation unit 12 determines a difference qe between the observed value qm and the output qh of the attitude propagation unit 12. A time-invariable component (DC component, so to say) ωd0, a basic frequency component ωd1 and a secondary frequency component ωd2 are estimated on the basis of the quantity qe after having passed through band-pass filters 1 and 1/(s*s+ω2*ω2), 1/(s*s+ω2*ω2) and then a primary filter KPi+KIi/s, (i=0, 1, 2).

The drift ωd of the gyro is determined as a sum of the individual frequency components in accordance with the following expression (39):

$$\omega d = \omega d0 + \omega d1 + \omega d2 \qquad (39)$$

By subtracting the estimated value ωd of the drift from the gyro output ωm, the estimated value ωh for the attitude angular velocity can be obtained. By integrating the estimated value ωh over one sampling period, an estimated value qh of the current attitude angle can be obtained in addition to the estimated value of the attitude angle before one sampling cycle.

Figure 11:
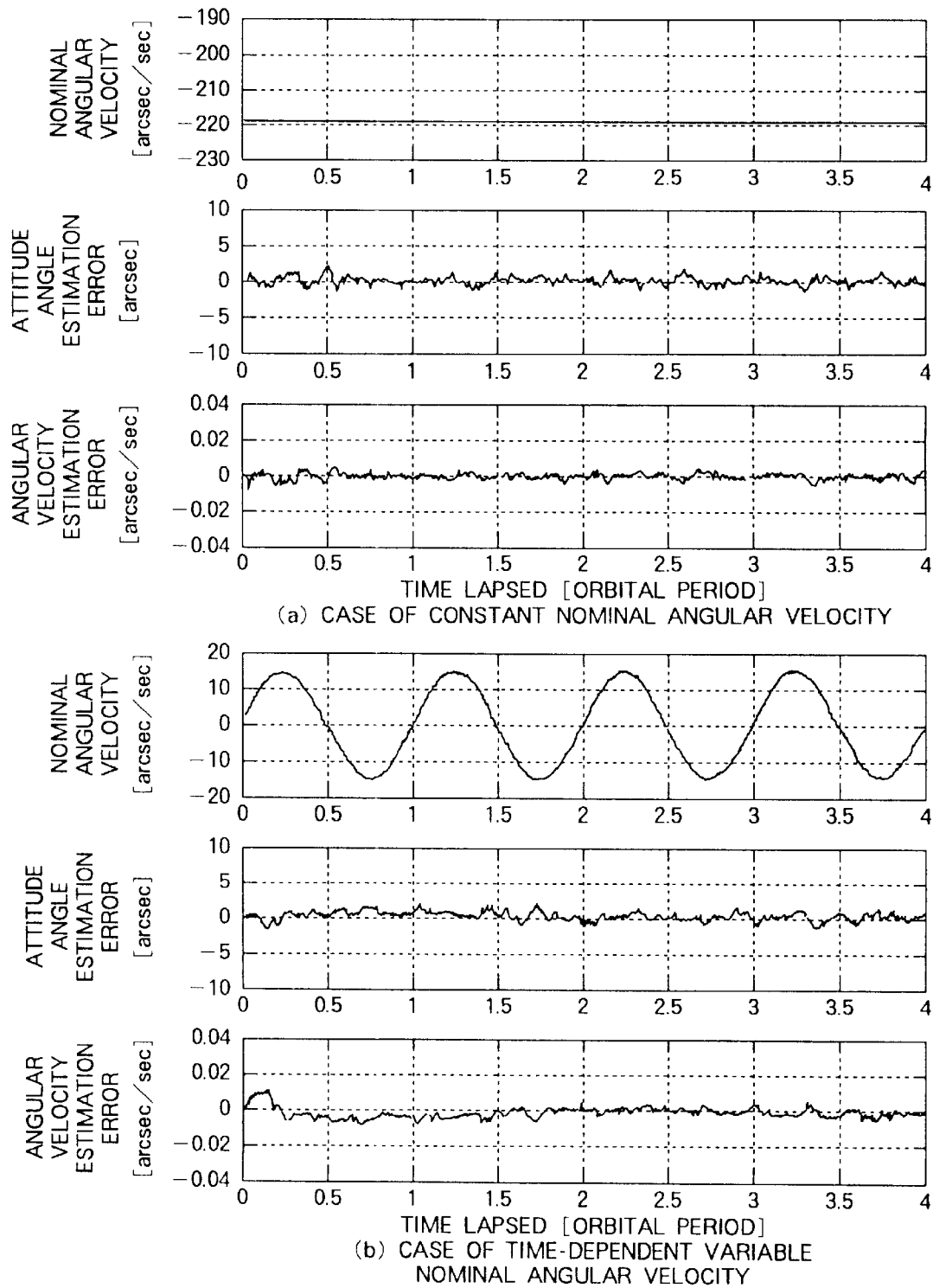
FIG. 11 shows graphical diagrams for illustrating exemplary numerical values of estimated drift of the gyro employed in the artificial satellite attitude determination system according to the eighth embodiment of the invention.

A frequency component at a nominal angular velocity of the artificial satellite is used as the basic frequency. When the basic frequency changes in dependence on change in the orbital angular velocity ω0, as can be seen in FIG. 11, the band-pass filter for the basic frequency is mathematically given by 1/(s*s+ω0*ω0).

When the artificial satellite is steered around the yaw axis during the orbital period, not only the orbital angular velocity ω0 but also a component having twice as high frequency makes appearance in the nominal angular velocity. Accordingly, the secondary frequency component ωd2 is caused to pass through the band-pass filter of 1/(s*s+ 4*ω0*ω0)

In the foregoing, use of observer-type filters have been presumed. However, similar effects can be obtained by using Kalman filter by incarnating therein the drift dynamics. By way of example, when the artificial satellite is steered around the yaw axis, dynamics give by the undermentioned expression (40) may be incarnated in the filter.

$$d/dt(f0)=0$$

$$d/dt(f1)=\omega 0*g1, \ d/dt(g1)=-f1/(\omega 0*\omega 0)$$

$$d/dt(f2)=2*\omega 0*g2, \ d/dt(g2)=-f2/(4*\omega 0*\omega 0) \qquad (40)$$

where f0, f1, g1, f2, g2 represent status quantities of the filter corresponding to a time-invariable component, the frequency component and the secondary frequency component of the drift, and symbol "d/dt()" represents differentiation of the parenthesized variable as a function of time.

In the foregoing description, it has been assumed that the attitude sensor is constituted by the star sensor. However, the drifts in the gyro may be estimated by resorting to a similar method by using the output of the other sensor such as the sun sensor, earth sensor or the like.

FIG. 11 shows graphical diagrams illustrating exemplary numerical values calculated in respect to the estimated errors of the attitude angle and the attitude angular velocity of an artificial satellite in the case where Kalman filters are employed in implementing the system according to the invention. Parenthetically, FIG. 11 corresponds to FIG. 15 referenced in the description of the related art.

As can be seen in FIG. 11, with the attitude determination system according to the invention, the attitude of the artificial satellite can be determined with improved accuracy not only in the case where the nominal angular velocity of the artificial satellite is constant but also when the nominal angular velocity is variable as a function of time (i.e., time-variable). Furthermore, in the drift estimating scheme for the gyro of the artificial satellite according to the instant embodiment of the invention, observation performance can be realized by separating dynamically the time-invariable component of the drift and the time-dependent variable component. Thus, sensitivity to the observation noise can be decreased in the state where the transient response of the filters is gentle as well as in the steady state. For these reasons, the attitude determination system can be realized with high accuracy and reliability.

Embodiment 9

Figure 12:
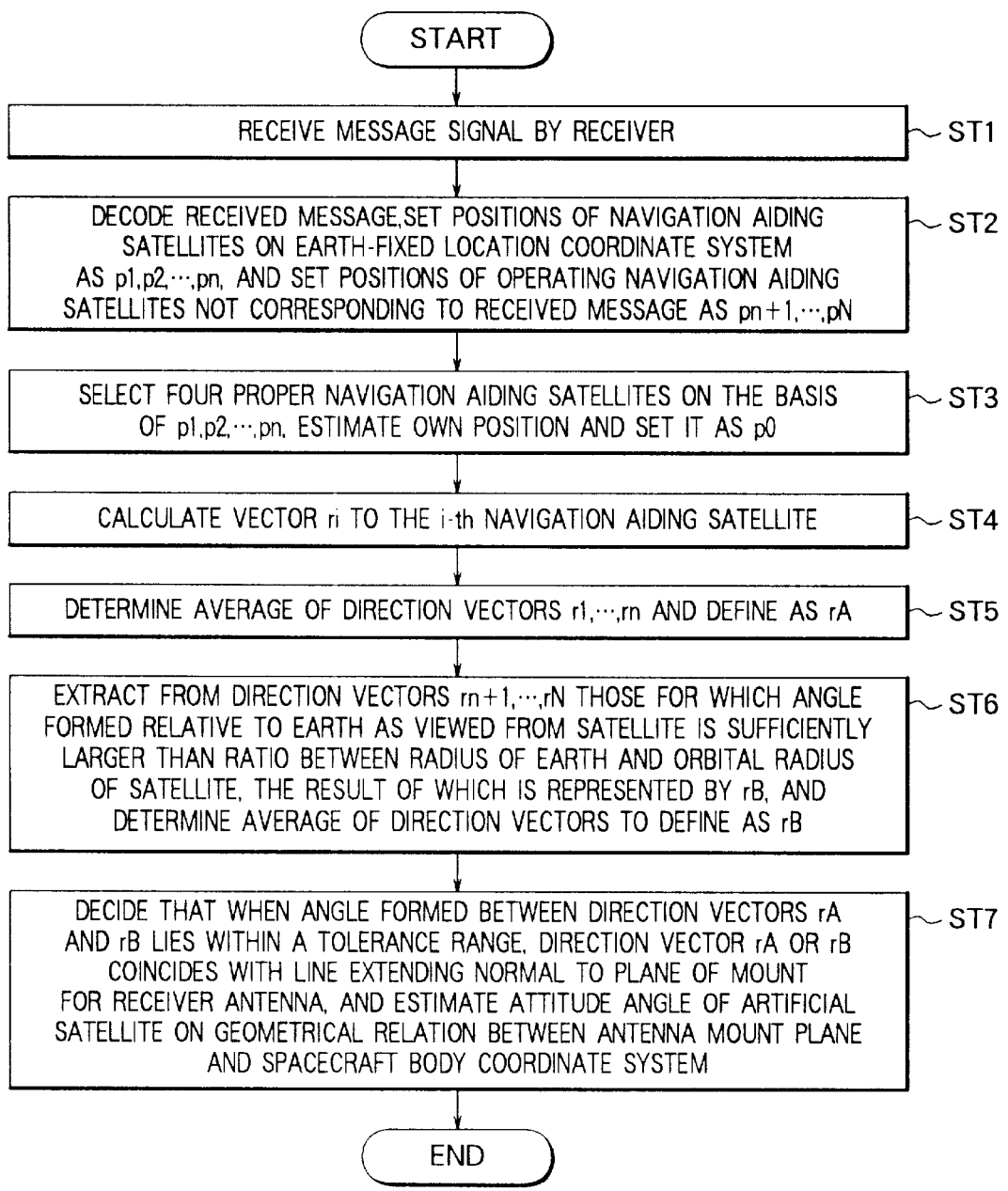
FIG. 12 is a flow chart for illustrating a procedure of estimating roughly the attitude of an artificial satellite by using a message signal from a navigation aiding satellite.
Figure 13:
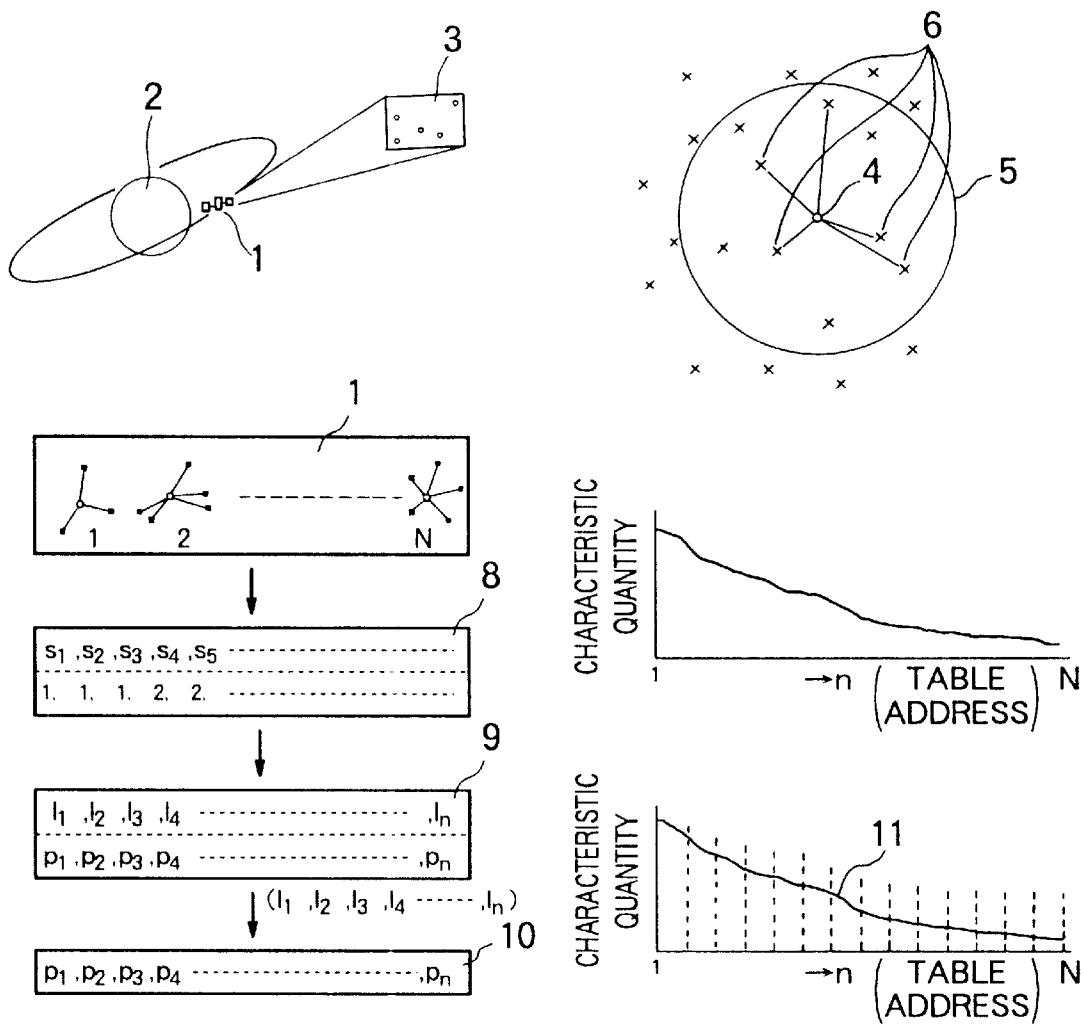
FIG. 13 is a schematic view for illustrating operation of a star identifying module of a conventional artificial satellite attitude determination system.

An artificial satellite attitude determination system according to a ninth embodiment of the invention will be described by reference to FIG. 12 which shows a flow chart for illustrating a procedure of supplying rough value concerning the attitude of an artificial satellite equipped with a dedicated receiver capable of receiving message signals from navigation aiding satellites.

Before entering into detailed description, the concept underlying the artificial satellite attitude determination system according to the instant embodiment will be briefly mentioned.

With the navigation aiding satellite, it is contemplated to mean an artificial satellite which is equipped with a transmitter having facilities for generation of a clock signal and a spectrum diffusing modulation for aiding navigation of a plurality of artificial satellites, travelling on different cruising orbits around the earth.

The navigation aiding satellite sends in the direction towards the earth a message containing the information concerning the position and the velocity thereof after the spectrum diffusing modulation with a specific code. The artificial satellite to realize the attitude determination thereof receives and demodulates the signal from the navigation aiding satellite (this signal will hereinafter be referred to as the message signal) through the medium of dedicated receiver installed on the surface of the earth, in the air or in the space to thereby acquire the relative distance thereof from the navigation aiding satellite and the velocity information by measuring the phase of the received signal and the Doppler shift.

The artificial satellite determines the absolute position and the velocity thereof by processing the information mentioned above by a navigation arithmetic means. At that time, the artificial satellite estimates roughly the attitude thereof on the basis of the positional information of the navigation aiding satellite corresponding to the received message signal and the positional information of other operating navigation aiding satellites which do not correspond to the received message signal.

More specifically, in a step ST1, the message signal from the navigation aiding satellite is received by the dedicated receiver. In a step ST2, the received message is decoded, whereon the positions of the navigation aiding satellites on the earth-fixed location coordinate system are determined as p1, p2, . . . , pn. Furthermore, positions of the operating navigation aiding satellites which do not correspond to the received message are determined as pn+1, . . . , pN. Because the orbital information of all the operating navigation aiding satellites is contained in the message signals, it is possible to determine the positions p1, p2, . . . , pn.

In a step ST3, four proper artificial satellite are selected on the basis of the position information p1, p2, . . . , pn, whereby the position of the artificial satellite is defined as "p0" in accordance with a convenient method, e.g. a method described in Nishimura et al's "GUIDANCE AND CONTROL FOR NAVIGATION IN SPACE" published by Japanese Institute of Measurements and Automatic Control Engineer, pp. 240–241 (1995). In a step ST4, the direction vector ri to the i-th (i=1, . . . , N) navigation aiding satellite from the artificial satellite of concern is arithmetically determined.

In a step ST5, an average of the direction vectors r1, . . . , rn is determined and defined as "rA". Because the mean direction vector rA represents the average direction of the navigation aiding satellites which can be viewed from the receiver and because the antenna mounted on the receiver is omnidirectional, the mean direction vector rA can roughly indicate the direction normal to the plane on which the receiver is mounted.

In a step ST6, of the direction vectors rn+1, . . . , rN, those for which the angle formed relative to the earth as viewed from the artificial satellite concerned is sufficiently larger than the ratio between the radius of the earth and the semi-major axis of the ellipse of the satellite are extracted and averaged, the result of which is represented by rB. The reason why there may exist such navigation aiding satellite which does not correspond to the received message can be explained by the fact that the navigation aiding satellite is positioned at either side of the position at which the receiver is mounted or the navigation aiding satellite is located in the shadow of the earth. Accordingly, the quantity rB represents substantially the direction within which the normal line to the receiver mount plane extends.

In a step ST7, decision is made whether or not the angle formed between the direction vectors rA and rB lies within a tolerance range. If so, it is then determined that the direction vector rA or rB coincides with the line extending normal to the plane on which the antenna of the receiver is mounted, whereon the attitude angle of the artificial satellite of concern is estimated on the geometrical relation between the plane of the antenna mount and the spacecraft body coordinate system.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. An attitude determination system for an artificial satellite, comprising:

an image processor for processing star images which are observation values of stars sensed at predetermined time points by a star sensor mounted on said artificial satellite to arithmetically determine direction vectors of said observed stars;

a rotation estimator for estimating a rotational motion between an attitude of said artificial satellite at a predetermined time point and an attitude of said artificial satellite at another time point;

an elongation estimator, having an output of said rotation estimator and an output of said image processor as its inputs, which estimates elongations between the direction vectors of said observed stars on the basis of said estimated rotational motion;

a star identifier for establishing correspondences between a plurality of the stars for which relation of said elongations has been determined and stars on a star catalog; and an attitude angle estimator for estimating an attitude angle of said artificial satellite on the basis of result of the identification of the stars, wherein said rotation estimator uses the star images on a plurality of image screens respectively photographed at different image pick-up time points by said star sensor.

2. An artificial satellite attitude determination system according to claim 1, wherein said rotation estimator means is adapted to estimate an average motion of the star images on a plurality of image screens generated at image pick-up time points close to one another, to thereby establish correspondences among individual star images on a plurality of image screens generated at image pick-up time points remote from one another on the basis of said estimated average motion of the stars, for thereby estimating the rotational motion of said artificial satellite during a period intervening between the successive image pick-up time points.

3. An artificial satellite attitude determination system according to claim 1, wherein said attitude angle estimator is adapted to arithmetically determine candidates for the attitude angle at a current time point on the basis of estimated value of the rotational motion estimated by said rotation estimator, while said star identifier is adapted for providing a number of candidates for the identification of the stars on said star catalog for said observed star images, and wherein on the basis of difference between the position of the star image as picked up by said star sensor and the position of the star image predicted from the star catalog, those of said candidates for the attitude angle or those of said candidates for the identification which can not be present are sequentially eliminated as said star images are inputted from said star sensor, to thereby estimate the attitude angle of the artificial satellite on the basis of the candidate remaining to the last.

4. An artificial satellite attitude determination system according to claim 1, wherein said star identifier is adapted to compare the directions of the observed stars directly with those of the stars on the star catalog to thereby extract the stars for the candidates and arithmetically determine the elongations of the observed stars and those on the star catalog relevant to said candidate stars, respectively, whereby the candidate stars for which elongations are sufficiently close to one another are outputted as the result of the identification.

5. An artificial satellite attitude determination system according to claim 1, wherein in the artificial satellite for which attitude angle information is of relatively low accuracy, said star identifier is adapted to identify the corresponding star on the star catalog on the basis of the directions of plural stars observed by said star sensor by determining a vector of difference between the directions of two of said observed stars and comparing said vector of difference between the directions of the stars on said star catalog.

6. An artificial satellite attitude determination system according to claim 1, wherein in the identification of the star by comparing the elongations among a plurality of observed stars with elongations among the stars on said star catalog, when differences between the elongations of plural stars on said star catalog as generated as the candidates for one observed star and the elongations of plural observed stars fall within an allowable error range, said star identifier regards said stars on said star catalog as the candidates for said observed stars to thereby combine said stars on said star catalog and said observed stars in a set and selects as secondary candidates for the observed stars the stars on the star catalog be longing to said set when said set makes appearance a number of times exceeding a predetermined value inclusive.

7. An artificial satellite attitude determination system according to claim 1, wherein when correspondence is established between asset including a plurality of vectors and a set including a plurality of other vectors containing noise as generated during a same rotational motion as said vectors, said attitude angle estimator estimates a coordinate transformation matrix between said vectors included in said sets, respectively, by first displacing one of said sets close to the other set through appropriate rotational motion and by resorting to a sequential estimating procedure for the rotational motions linking the vector set as displaced and the other vector set with rotation angle of zero being set as an initial value.

8. An attitude determination system for an artificial satellite, comprising:

image processing means for image-processing star images which are observation values of stars sensed at predetermined time points by a star sensor mounted on said artificial satellite to arithmetically determine direction vectors of said observed stars;

rotation estimating means for estimating a rotational motion between an attitude of said artificial satellite at a predetermined time point and an attitude of said artificial satellite at another time point;

elongation estimating means, having an output of said rotation estimating means and an output of said image processing means as its inputs, for estimating elongations between the direction vectors of said observed stars on the basis of said estimated rotational motion;

star identifying mean for establishing correspondences between a plurality of the stars for which relation of said elongations has been determined and stars on a star catalog; and attitude angle estimating means for estimating an attitude angle of said artificial satellite on the basis of result of the identification of the stars;

wherein said elongation estimating means uses the star images on a plurality of image screens respectively photographed at different image pick-up time points by said star sensor.

9. An artificial satellite attitude determination system according to claim 8, wherein said elongation estimating means estimates elongations among direction vectors of a plurality of stars which are photographed by said star sensor at unequal image pick-up time points by means of an estimated value of the rotational motion of said artificial satellite estimated by said rotation estimating means.

10. An artificial satellite attitude determination system according to claim 8, wherein said star identifying means is adapted to compare the directions of the observed stars directly with those of the stars on the star catalog to thereby extract the stars for the candidates and arithmetically determine the elongations of the observed stars and those on the star catalog relevant to said candidate stars, respectively, whereby the candidate stars for which elongations are sufficiently close to one another are outputted as the result of the identification.

11. An artificial satellite attitude determination system according to claim 8, wherein in the artificial satellite for which attitude angle information is of relatively low accuracy, said star identifying means is adapted to identify the corresponding star on the star catalog on the basis of the directions of plural stars observed by means of said star sensor by determining a vector of difference between the directions of two of said observed stars and comparing said vector of difference between the directions of the stars on said star catalog.

12. An artificial satellite attitude determination system according to claim 8, wherein the identification of the star by comparing the elongations among a plurality of observed stars with elongations among the stars on said star catalog, when differences between the elongations of plural stars on said star catalog as generated as the candidates for one observed star and the elongations of plural observed stars fall within an allowable error range, said star identifying means regards said stars on said star catalog as the candidates for said observed stars to thereby combine said stars on said star catalog and said observed stars in a set and selects as secondary candidates for the observed stars the stars on the star catalog belonging to said set when said set makes appearance a number of times exceeding a predetermined value inclusive.

13. An artificial satellite attitude determination system according to claim 8, wherein when correspondence is established between a set including a plurality of vectors and a set including a plurality of other vectors containing noise as generated during a same rotational motion as said vectors, said attitude angle estimating means estimates a coordinate transformation matrix between said vectors included in said sets respectively, by first displacing one of said sets close to the other set through appropriate rotational motion and by resorting to a sequential estimating procedure for the rotational motions linking the vector asset as displaced and the other vector set with a rotation angle of zero being set as an initial value.

14. An attitude determination system for an artificial satellite, comprising:

image processing means for image-processing star images which are observation values of stars sensed at predetermined time points by a star sensor mounted on said artificial satellite to arithmetically determining direction vectors of said observed stars;

rotation estimating means for estimating a rotational motion between an attitude of said artificial satellite at a predetermined time point and an attitude of said artificial satellite at another time point;

elongation estimating means, having an output of said rotation estimating means and an output of said image processing means as its inputs, for estimating elongations between the direction vectors of said observed stars on the basis of said estimated rotational motion;

star identifying means for establishing correspondence between a plurality of the stars for which relation of said elongations has been determined and stars on a star catalog; and attitude angle estimating means for estimating an attitude angle of said artificial satellite on the basis of result of the identification of the stars, wherein said attitude angle estimating means uses the star images on a plurality of image screens respectively photographed at different image pick-up time points by said star sensor.

15. An artificial satellite attitude determination system according to claim 14, wherein said attitude angle estimating means is adapted to arithmetically determine a plurality of candidates for the attitude angle at a current time point on the basis of an estimated value of the rotational motion estimated by said rotation estimating means, while said star identifying means is adapted to provide a number of candidates for the identification of the stars on said star catalog for said observed star images, and on the basis of a difference between the position of the star image as picked up by said star sensor and the position of the star image predicted from the star catalog, said candidates for the attitude angle or said candidates for the identification which cannot be present are sequentially eliminated to estimate the attitude angle of the artificial satellite on the basis of the candidate remaining to last.

16. An artificial satellite attitude determination system according to claim 14, wherein said star identifying means is adapted to compare the directions of the observed stars directly with those of the stars on the star catalog to thereby extract the stars for the candidates and arithmetically determine the elongations of the observed stars and those on the star catalog relevant to said candidate stars, respectively, whereby the candidate stars for which elongations are sufficiently close to one another are outputted as the result of the identification.

17. An artificial satellite attitude determination system according to claim 14, wherein in the artificial satellite for which attitude angle information is of relatively low accuracy, said star identifying means is adapted to identify the corresponding star on the star catalog on the basis of the directions of plural stars observed by means of said star sensor by determining a vector of difference between the directions of two of said observed stars and comparing said vector of difference between the directions of the stars on said star catalog.

18. An artificial satellite attitude determination system according to claim 14, wherein the identifications of the star by comparing the elongations among a plurality of observed stars with elongations among the stars on said star catalog, when differences between the elongations of plural stars on said star catalog as generated as the candidates for one observed star and the elongations of plural observed stars fall within an allowable error range, said star identifying means regards said stars on said star catalog as the candidates for said observed stars to thereby combine said stars on said star catalog, and said observed stars in a set and selects as secondary candidates for the observed stars the stars on the star catalog belonging to said set when said set makes appearance a number of times exceeding a predetermined value inclusive.

19. An artificial satellite attitude determination system according to claim 14, wherein when correspondence is established between the set including a plurality of vectors and a set including a plurality of other vectors containing noise as generated during the same rotational motion as said vectors, said attitude angle estimating means estimates a coordinate transformation matrix between said vectors included in said sets, respectively, by first displacing one of said sets close to the other set through an appropriate rotational motion and by resorting to a sequential estimating procedure for the to rational motions linking the vector set as displaced and the other vector set with a rotation angle of zero being set as an initial value.

* * * * *